(12) United States Patent
Brynolf et al.

(10) Patent No.: US 10,660,357 B2
(45) Date of Patent: May 26, 2020

(54) METHOD FOR PREPARING INHIBITED STARCH WITH IMPROVED WAREHOUSE STORAGE STABILITY

(71) Applicant: Lyckeby Starch AB, Kristianstad (SE)

(72) Inventors: Mikael Brynolf, Kristianstad (SE); Mathias Samuelsson, Kristianstad (SE); Åke Ståhl, Sösdala (SE)

(73) Assignee: Lyckeby Starch AB, Kristianstad (SE)

( * ) Notice: Subject to any disclaimer, the term of this patent is extended or adjusted under 35 U.S.C. 154(b) by 171 days.

(21) Appl. No.: 15/551,000

(22) PCT Filed: Feb. 15, 2016

(86) PCT No.: PCT/SE2016/050113
§ 371 (c)(1),
(2) Date: Aug. 14, 2017

(87) PCT Pub. No.: WO2016/133447
PCT Pub. Date: Aug. 25, 2016

(65) Prior Publication Data
US 2018/0035703 A1    Feb. 8, 2018

(30) Foreign Application Priority Data
Feb. 16, 2015 (SE) ...................................... 1550169

(51) Int. Cl.
| | | |
|---|---|---|
| A23L 29/219 | (2016.01) | |
| C08B 31/18 | (2006.01) | |
| A23L 5/49 | (2016.01) | |
| A23L 3/3463 | (2006.01) | |
| C08B 30/02 | (2006.01) | |

(52) U.S. Cl.
CPC ........... *A23L 29/219* (2016.08); *A23L 3/3463* (2013.01); *A23L 5/49* (2016.08); *C08B 30/02* (2013.01); *C08B 31/18* (2013.01); *A23V 2002/00* (2013.01); *A23V 2250/06* (2013.01); *A23V 2250/55* (2013.01)

(58) Field of Classification Search
CPC ..... A23L 29/212; A23L 29/219; C08B 30/12; C08B 31/18
USPC ....................................................... 426/578
See application file for complete search history.

(56) References Cited

U.S. PATENT DOCUMENTS

| | | |
|---|---|---|
| 2,317,752 A | 4/1943 | Fuller |
| 3,463,668 A | 8/1969 | Evans et al. |
| 3,490,917 A | 1/1970 | Doe et al. |
| 3,832,342 A | 8/1974 | Rutenberg et al. |
| 3,899,602 A | 8/1975 | Rutenberg et al. |
| 3,949,104 A | 4/1976 | Cheng et al. |
| 3,977,897 A | 8/1976 | Wurzburg et al. |
| 4,303,451 A | 12/1981 | Seidel et al. |
| 4,303,452 A | 12/1981 | Ohira et al. |
| 8,268,989 B2 | 9/2012 | English et al. |
| 2013/0309386 A1* | 11/2013 | Han ...................... A23L 29/219 426/578 |

FOREIGN PATENT DOCUMENTS

| | | |
|---|---|---|
| EP | 0721471 A1 | 7/1996 |
| EP | 1038882 A1 | 9/2000 |
| GB | 2506695 A | 4/2014 |
| JP | S61254602 A | 11/1986 |
| JP | 2004123959 A | 4/2004 |
| RU | 2496791 C2 | 10/2013 |
| WO | WO-2005026212 A1 | 3/2005 |
| WO | WO-2014053833 A1 | 4/2014 |

OTHER PUBLICATIONS

Janny "Magic of Antioxidants" Food safety focus (53rd issue, Dec. 2010—Food Safety Platform pp. 4. (Year: 2010).*
Ewart, Amino Acid Analyses of Glutenins and Gliadins, J. Sci. Fd Agric., 1967, vol. 18, March, pp. 111-116 (Year: 1967 ).*
Reiners et al "Amino acid composition of the protein in commercial corn starch", Mar. 1970, pp. 205 and 206 (Year: 1970).*
Hans H. Ottenheym, Synthetic Amino Acids and Their Use in Fortifying Foods, Journal of agricultural Food chemistry, vol. 18, No. , 1970, pp. 1010-1014 (Year: 1970).*
Martin, "Crosslinking of Starch by Alkaline Roasting", Journal of Applied Polymer Science, vol. 11, pp. 1283-1288, 1967.
International Search Report dated May 23, 2016 for PCT Application No. PCT/SE2016/050113.

* cited by examiner

*Primary Examiner* — Jyoti Chawla
(74) *Attorney, Agent, or Firm* — Moser Taboada

(57) ABSTRACT

A method for preparing an inhibited starch with improved warehouse storage stability is disclosed, wherein it comprises the steps of a) providing a slurry containing a native granular starch obtained from a starch containing raw material, b) adding at least one amino acid, or a combination of two or more of these, and at least one oxidant to the slurry with a view to inhibiting the granular starch, c) adding at least one organic acid or a bisulfite to the slurry with a view to eliminating residual reactant chemicals, off-tastes, and undesired smell, and d) adding at least one antioxidant to the slurry with a view to stabilizing the achieved inhibition of the starch during warehouse storage, as well as an inhibited starch with improved warehouse storage stability prepared with said method, use of said inhibited starch as an ingredient in a food product, and a food product containing said inhibited starch.

20 Claims, 14 Drawing Sheets

METHOD FOR PREPARING INHIBITED STARCH WITH IMPROVED WAREHOUSE STORAGE STABILITY

TECHNICAL FIELD OF THE INVENTION

The present invention refers to a method for preparing inhibited starch with improved warehouse storage stability, to an inhibited starch prepared with said method, to use of said inhibited starch as an ingredient in food products, and to a food product containing said inhibited starch.

BACKGROUND ART

Starch is an important ingredient for the food industry and is very commonly used in a great multiplicity of food applications and food production processes. Natural, non-modified starch, known by skilled persons in the art as "native starch", is sometimes used as such but has several disadvantages.

The primary function of starch in food applications is as thickening agent with a view to provide the requested viscosity, texture and mouth feel of food products. The texture and viscosity property are built up by hydration of the granular starch achieved when the granular starch is heated in an aqueous suspension. The granular starch absorbs water when the temperature is increased above the gelatinization temperature, i.e. the starch granule is being hydrated and swollen and its viscosity is considerably increased. In the case of using native starch the hydrated and swollen starch granules are not stable and, consequently, if the temperature is kept for longer time or is increased to higher temperatures the viscosity will reach its so called "peak viscosity". Accordingly, the granular shape will be disrupted and disintegrates. The viscosity will be significantly reduced. Besides the reduced viscosity, another drawback will be an unpleasant long and cohesive texture.

As a result of the above-mentioned problem the most important parameters to control or to avoid are high temperatures, shear forces, and, particularly, acidic conditions. A result when the cook goes beyond the "peak viscosity" is a breakdown of the granular structure. Instead, it is desirable to change the starch property so that the viscosity is stable or even increase over time, thus avoiding viscosity decrease and granular breakdown when treated under high heat, strong shear force, and/or acidic conditions. This maintains hydrated highly swollen but intact, hydrated starch granules.

The requested effect is often referred to as increased starch robustness. Thus, the granular starch is more resistant to high temperatures, longer heating times, strong shear forces, and acidic conditions or combinations of those parameters.

The most commonly used method of modification to give starch increased process tolerance is to use the technique known as chemical cross-linking. Chemical cross-linking inhibits the starch granule, so that when it is heated in water its swelling is inhibited. If the level of cross-linking is too low a continued heating combined with strong physical force or not will end up in a total or partial starch solution. Chemical cross-linking prevents granular breakdown under such treatments. The chemical cross-linking is achieved by substituting the starch with a bi-functional reagent, resulting in a covalent bond between the starch molecules. This can be done with certain approved methods and chemicals, e.g. phosphorus oxychloride, STMP (sodium trimetaphosphate), adipic-acetic mixed anhydride, and epichlorohydrin. The different approved methods for chemical cross-linking are well described in the literature and are commonly used in the starch industry. In practice, this means that by cross-linking of the starch granule it will be capable of maintaining its granular integrity when exposed to temperatures and high shear force or at high temperatures without or together with a low degree of shear. The higher the degree of cross-linking, the more robust the starch will be against high temperature, shear forces and acidic conditions or combinations of those parameters.

In practice, these cross-linking techniques for modifying the property of the swelling of the starch granule can be adapted to the application and the process which the starch is to be used in, so that optimal properties in the form of viscosity and texture are obtained due to the starch as such.

In the food industry, there is a great desire to replace chemically modified starches with starches that are not chemically modified, due to the trend to go "natural" among the food ingredients. The starch shall still have equal properties as the chemically modified ones.

Non-chemical inhibition of starch granules can be performed with dry heat inhibition, also called alkaline dry roasting, similar to the so called British Gums. In this method the starch is subjected to high temperatures in an almost totally moisture free condition in combination with an alkaline pH, which is reached by addition of e.g. sodium hydroxide or soda. Temperatures of 120-160° C. at a pH of 8-11 and a reaction time of 2-120 hours give different inhibition levels. This technique is well known and disclosed in the literature (Cross-linking of starch by Alkali Roasting, Journal of Applied Polymer Science Vol. 11 PP 1283-1288 (1967); IRVIN MARTIN, National Starch & Chemical Corporation) and also in several patents (U.S. Pat. No. 8,268,989 B2; EP 0 721 471; EP 1 0382 882; U.S. Pat. Nos. 3,977,897; 4,303,451; Japanese Patent No 61-254602; U.S. Pat. Nos. 4,303,452; and 3,490,917).

The problem with heat inhibition of starch is that side reactions give an undesirable taste and color to the starch. A discoloration of the starch occurs at temperatures above approximately 130° C. To avoid problems with the side reactions the temperature can be reduced, but this causes the reaction time to be prolonged, thereby increasing the production cost significantly. Furthermore, the heat inhibition technology requires high energy costs and high investment costs.

It is further known that a weak inhibition can be achieved by subjecting the starch granule to low concentrations of a bleaching agent, i.e. an oxidant (oxidizing agent) at an alkaline pH together with so called oxidation modifiers, which are different nitrogen containing compounds. In some cases the residual protein in the starch granule remaining after extraction can be used as the oxidation modifiers, but it generally needs less pure starches than nowadays commercial starches has, i.e. above 0.4% protein content of starch dry matter. This inhibition technology is known and is disclosed in U.S. Pat. No. 2,317,752 and in the UK Patent Application GB 2506695. However, the latter two methods of inhibiting starch can be performed only to a limited inhibition level. If higher levels of oxidants are added the starch will instead be oxidized, leading to a de-polymerization which results in reduced viscosity and easier disruption of the granular structure during cooking.

It is also known that inhibition of granular starch can be achieved by combining an oxidant and the amino acid glycine. This process is disclosed in U.S. Pat. No. 3,463,668. However, this method results in an unstable, temporarily inhibition and is thereby not capable of replacing chemically cross-linked granular starches in the food industry.

Accordingly, there is a need to develop a method for inhibiting starch to higher levels, i.e. a method which results in inhibited starches with improved properties like taste, smell and color, and which is more cost effective than traditional techniques to produce and overcomes the drawbacks in earlier described techniques. There is also a need for an inhibited food starch which is stable during the storage time in the warehouse and which has improved organoleptic properties, and also the food products produced there from.

SUMMARY OF THE INVENTION

The object with the present invention is to fulfill the above-mentioned needs and to provide an inhibited starch having the desired advantageous properties disclosed. This object is achieved with the method according to the present invention as defined in claim 1. This object is also achieved with the inhibited starch being stabilized for extended storage conditions, with use thereof as an ingredient in a food product, and with a food product containing said inhibited starch, as defined in the subsequent independent claims. Particular and preferred embodiments are disclosed in the dependent claims.

One aspect of the present invention refers to a method for preparing an inhibited starch with improved warehouse storage stability, wherein it comprises the steps of
 a) providing a slurry containing a native granular starch obtained from a starch containing raw material,
 b) adding at least one amino acid, or a combination of two or more of these, and at least one oxidant to the slurry with a view to inhibit the swelling of the granular starch during a cook,
 c) adding at least one organic acid or a bisulfite to the slurry with a view to eliminating the residual oxidant chemical, off-taste, and undesired smell, and
 d) adding at least one antioxidant to the slurry with a view to stabilize the achieved inhibition of the starch during warehouse storage.

In another aspect the present invention refers to an inhibited starch with improved warehouse storage stability prepared with the method according to the present invention.

In still another aspect the present invention refers to the use of said inhibited starch as an ingredient in food products.

In a further aspect the present invention is a food product containing said inhibited starch.

More precisely, the present invention provides a method for inhibiting granular starch to higher inhibition levels for which the achieved inhibition is stable, wherein the inhibited granular starch also has such beneficial properties such as viscosity stability against temperature increase, shear forces, and acidic conditions. This means that the inhibited starch will have increased process robustness, i.e. becomes more resistant in certain food processes, like high pressure homogenization, performed at processing temperatures above the natural gelatinization temperature of the starch. Moreover, said inhibited granular starch has an increased gelatinization temperature with a few degrees Celsius, wherein it is more capable of maintaining its natural structure, i.e. the granular shape, in this kind of food processes.

A further advantage accompanying the present invention are that the unpleasant off-taste normally expressed in conventional inhibited starches made without chemical cross-linking is neutralized or eliminated. Still another advantage is that the protein, more precisely the naturally occurring amino acids therein and peptides therein with a molecular weight below 1 kDa, initially separated from the starch raw material, i.e. the raw material source the native starch has been extracted from, may be used as a source for the amino acid addition involved in the inventive method. This means that the inhibition may be carried out solely from the same raw material as the starch is extracted from, or that it can be made by using synthetic amino acids or amino acids from a foreign protein source.

DETAILED DESCRIPTION OF THE INVENTION AND PREFERRED EMBODIMENTS THEREOF

Figure 1:
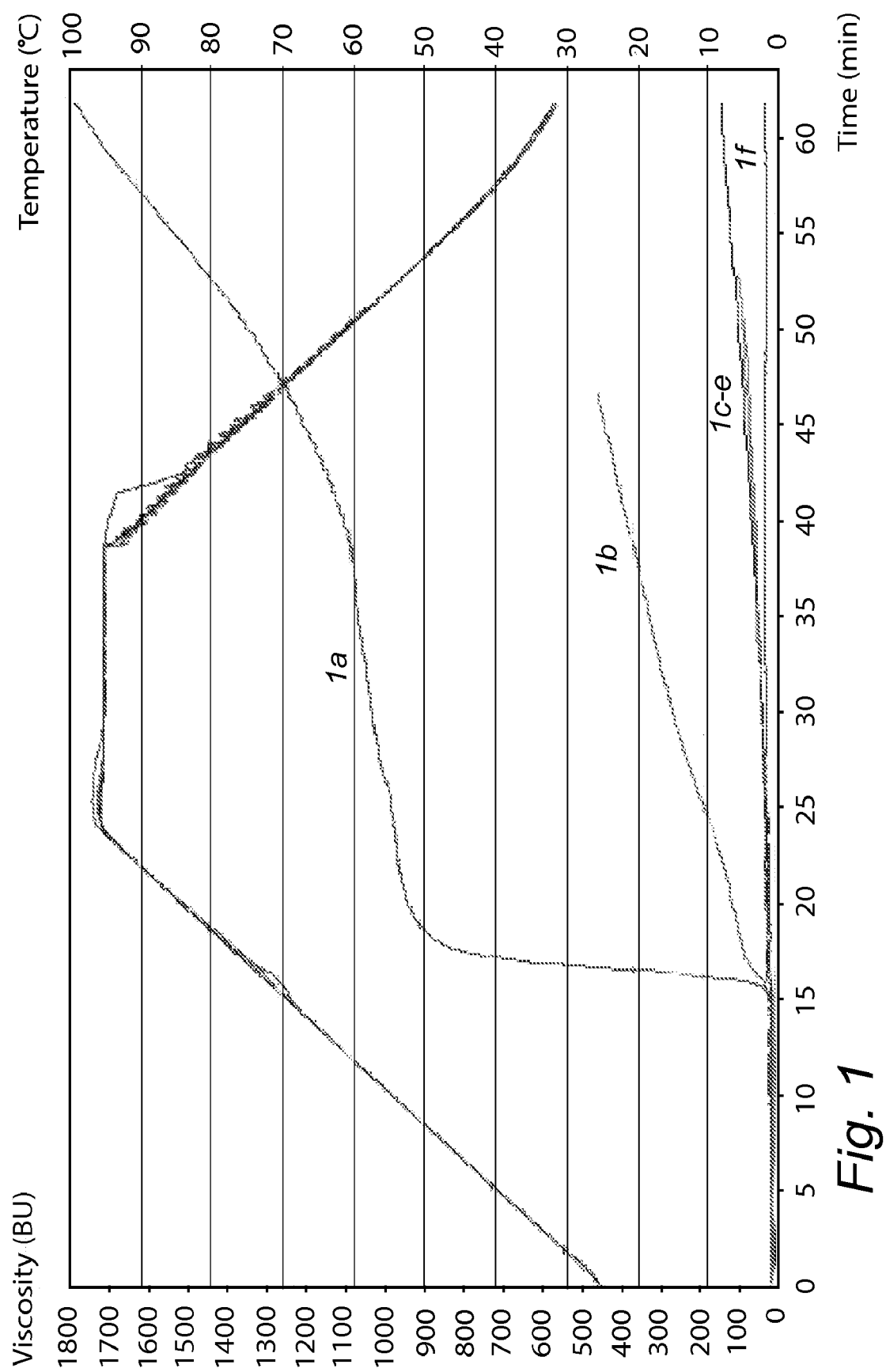
FIG. 1 shows the Brabender viscosity profile at neutral pH of inhibited starch according to examples 1a)-1f). A Brabender Amyloviscograph model E was used. Active chlorine: 0.1-0.8% w/w of DM starch. Glycine: 33.3% w/w of active chlorine. Thus, the ratio between active chlorine and glycine was 3:1. Starch concentration: 5% w/w. 350 cmg torsion spring. Distilled water was used for the preparation of the starch slurry in the measurement.

First, some expressions present in the application text will be defined.

The expression "native starch" used throughout the application text is intended to mean an extracted and purified starch, i.e. having a residual protein content of maximum 0.4% of DM starch, preferably lower than this value, for which the naturally occurring properties have not been changed, either chemically or physically. Thereby the starch is still in its native state and has unchanged properties. The term native starch is well-known by a man skilled in the art.

The expression "amino acid-like compound" used throughout the application text is intended to mean any of a group of organic compounds having one or more amino group —$NH_2$, and one or more carboxyl group, —COOH, being substituted or not by any other group. Such an "amino acid like compound" may be used as a complement or an alternative to the amino acid in the method disclosed here.

The expression "amino acid homologs" used throughout the application text is intended to mean amino acids of the same skeleton in which the amino group has been substituted with one or more groups.

The expression "protein hydrolysate" used throughout the application text is intended to mean a purified protein concentrate from different origins which has been hydrolyzed either by an acid and high temperature of above 95° C., and/or by treating such protein with proteolytic enzymes. A result of the hydrolyzation is that the protein cluster is separated into peptides and free amino acids with different molecular weights, i.e. is built up with different number of amino acid building blocks and or separated into single amino acids. In order to be possible to penetrate the starch granule into its amorphous parts of the semi crystalline structure the peptides shall be below 1 kDa in size. Consequently, the expression "protein hydrolysate" means an undefined mixture of peptides and amino acid monomers below 1 kDa in size and therefore can be used as the amino-group containing reactant part in the present invention.

The expression "amino acid derivative" used throughout the application text is intended to mean amino acid substituted with another chemical group.

The expression "warehouse storage stability" used throughout the application text is intended to mean that such an inhibited starch maintains its inhibition level during storage at typical conditions in warehouses and transports.

The expression "calculated as active chlorine" used throughout the application text is intended to mean the amount of chlorine in its monomeric form (a molar weight of 35.5) bound with oxygen into $ClO^-$, which is the active oxidant.

The expression "DM" used throughout the application text is intended to mean "Dry Matter", which is a measure of total solids obtained from evaporating a solution under vacuum to dryness. DM may also be referred to as "total solids by drying" or "dry solids". Alternate expressions with an equivalent meaning are "dry substance" and "dry weight".

The expressions "containing active chlorine (x g/l)" and "% w/w active chlorine of DM starch" used throughout the application text is intended to mean the quantity of monomeric chlorine as bound into $ClO^-$ in the active oxidant in gram per liter and in weight percentage calculated as gram Cl coming from $ClO^-$ per gram DM starch.

The expression "% w/w DM starch" used throughout the application text is intended to mean the percentage of a defined substance calculated as gram per gram of DM starch.

The expression "protein conversion factor" used throughout the application text is intended to mean the conversion factor that is used to recalculate the analyzed % amino nitrogen (% N) to protein. A well-known method for analyzing the protein content is the so called "Kjeldahl method", in which the percentage of amino nitrogen is measured and subsequently recalculated to the amount of protein by using the conversion factor found in the literature, which depends on the average nitrogen content in different protein sources.

The expression "torsion spring of 250, 350 or 700 cmg" used in the examples of the application text is intended to mean the setting of the Brabender Amylograph torsion spring when evaluating the viscosity profile for such a starch paste. Different torsion springs give different responses due to the sensitivity of the spring and therefore it is needed to be defined what torsion spring that have been used to understand the viscosity response level and to be able to compare different Brabender curves. The expression and meaning of "torsion spring cmg" is well-known by a man skilled in the art and is often used in the measurement of starch pastes.

The native starch to be inhibited in the inventive method may be extracted from a large variety of raw material, such as potato starch, maize (corn) starch, tapioca starch, barley starch, rice starch, wheat starch, rye starch, oat starch, amaranth starch, quinoa starch, sago starch, bean starches, pea starch, Floridian starch and different varieties thereof, waxy potato starch, waxy maize (corn) starch, waxy tapioca starch, waxy barley starch, waxy rice starch, waxy sorghum starch, waxy wheat starch, waxy pea starch and high amylose starches, etc. In the starch production process the starch is extracted from the raw material, purified and dried into a powder, so called native starch. Starch from all kinds of origin, such as the above-listed raw materials, may be used in food applications, either in its native state or further modified with different technologies, to give desirable properties.

The production of native starch from different sources, the methods of modification of the native starch, and its accompanying properties are well-known in the art.

As disclosed above, one of the most commonly used modification method is chemical cross-linking, which is intended to make the starch more resistant against heat, shear forces, and acidic conditions.

In one embodiment of the method according to the present invention is using a waxy starch, i.e. an amylopectin rich starch with an amylopectin content of the starch DM of more than 90%. Amylopectin rich starches are considered to be more stable and do not have the need of stabilization by chemical mono-substitution to hinder retrogradation, such as acetylation and hydroxypropylation. It is well-known that the so called waxy starches have better stability properties compared to starches with higher amounts of amylose (non-waxy starches), when it comes to stability of hydrated starch pastes after gelatinization in water. The stability property is also better for waxy starches when it comes to freeze and thaw stability. Therefore, by combining the present invention with a waxy starch i.e. waxy maize (corn), waxy tapioca, waxy barley, etc, it is possible to achieve a starch product with properties that are comparable with chemically modified non-waxy based starches. In this perspective it is possible to create a starch product that can compete with chemically modified stabilized starches, i.e. acetylated and or hydroxypropylated starches. This monosubstitution stabilization of the starch is something else than the stabilization obtained with the present invention during the storage time in the warehouses. Mono-substitution stabilization of the starch is done in order to improve the solution stability against retrogradation and not to stabilize the inhibition.

In the method according to the present invention the properties of a native starch, or a chemically modified stabilized mono-substituted starch, are changed by inhibiting the starch granule by adding a combination of amino acids and an oxidant (oxidizing agent). The inhibited starch is achieved by extracting the native starch and purifying it to a level where the amount of residual protein is below 0.4% w/w, wherein said starch is considered as a protein free starch. The native starch is further mixed with water resulting in starch slurry having a concentration of 5-45% w/w, more preferably 20-35% w/w, even more preferably 25-30% w/w. The starch slurry is then heated to 5-70° C., i.e. below the gelatinization temperature for the particular starch used at the surrounding pH condition, preferably 15-45° C., more preferably 25-35° C., during continuous agitation with a view to avoid sedimentation. The pH value is adjusted with an acid or alkali to obtain a value of normally 7-12, but this may also lie outside this range as different amino acids require different pH levels during the treatment. However, an acidic pH is to be avoided as the active chlorine used in the process will form chlorine gas, which is undesired due to personal health risks, and a too high alkaline pH will cause alkaline gelatinization to occur.

At least one kind of amino acid, or combinations of two or more of these, may be added to the starch slurry during agitation. The amount of added amino acid is 0.01-10% w/w DM starch, preferably 0.05-3% w/w DM starch, more preferably 0.05-2.0% w/w DM starch. The amino acids used in the reaction may have been obtained from a natural source or are synthetically prepared, but are preferably naturally occurring amino acids used separately or in any combinations of two or more thereof. In one useful embodiment said amino acids are derived from the same starch source, i.e. the raw material, from which the starch to be inhibited originates. In this embodiment the protein rich fragments are separated from the starch source and are further fractionated, purified, and hydrolyzed to an amino acid rich concentrate, which is used as an inhibition reactant. Thus, in such a way an inhibited starch product can be achieved without addition of any synthetically derived amino acids, or amino acids obtained from other raw materials, to the reaction slurry, which must be considered as beneficial. The slurry is left under agitation, e.g. for 5-15 minutes before addition of the oxidant for migration into the starch granule. Examples of natural amino acids to add are alanine, cysteine, aspartic acid, glutamic acid, phenylalanine, glycine, histidine, isoleucine, lysine, leucine, methionine, asparagine, proline, glutamine, arginine, serine, threonine, valine, tryptophan, and tyrosine, or a homolog of these. Examples of homologues are the glycine homologues sarcosine (metylglycin), dimetylglycine and betaine (trimetylglycine). Examples of amino acid-like compounds are agaritine, alanosine, aspartame, aspartylglucosamine, glutaurine, taurine, tetrazolylglycine, tricine, and thymectacin. Different forms of optic isomers of the above-listed amino acids and amino acid-like compounds are also included as possible to use.

An oxidant, which also may be a bleaching agent, is then added to the starch and an amino acid mixture under agitation. The oxidant is a source of active chlorine, and is in one embodiment a hypochlorite. In a particularly useful embodiment the oxidant is sodium hypochlorite, or another kind of alkali metal or alkali earth metal hypochlorite, such as potassium hypochlorite, calcium hypochlorite, and magnesium hypochlorite. Although different kinds of hypochlorite can be used, the present invention is not limited to such oxidants. Thus, other sources of active chlorine can be used separately or as a mixture of such different kinds of oxidants providing active chlorine. The effect of the oxidant is not fully understood but it is clear that the oxidant is required, and it is assumed that it is, in some way, reacting with the amino acid so that it can be reacted to starch molecules and form cross bonds. In an alternative theory it is assumed that the oxidant and amino acid is working as a catalyst so that the starch molecules can directly interact with each other's to react and form a cross bonding. The added amount of oxidant is in the case of sodium hypochlorite as oxidant, calculated as the added amount as active chlorine, 0.03-30% w/w, preferably 0.1-10% w/w, more preferably 0.15-4% w/w. The slurry is then left under stirring so that the inhibition reaction can occur. This reaction is almost instantaneous, but of practical reasons it is more convenient to let the reaction proceed for a longer time with a view to avoid that residuals of active chlorine are left in the reaction vessel. The reaction time is therefore 1-1200 minutes, preferably 30-240 minutes, more preferably 30-180 minutes.

It is well-known by a man skilled in the art that treatment of starch with sodium hypochlorite will oxidize the starch and thus result in breakdown of the starch molecule, which reduces the molecular weight of the starch with a consequent reduction of its viscosity. Oxidation with sodium hypochlorite slightly stabilizes the starch against retrogradation. Therefore it is of importance to make clear that according to the inventive method the oxidation incorporation of carboxylic groups is avoided and, therefore, no oxidation with breakdown of the starch structure occurs. When the oxidation is made by an oxidation agent, e.g. sodium hypochlorite, it creates carboxyl groups, —COOH, in the starch molecules. This is well-known by a man skilled in the art, and further specific information can be found in literature about oxidation of starch. Analysis of the level of carboxyl groups can therefore be used as a method to determine if a starch product has been oxidized or not, and also as a method of defining the oxidation level.

The method of analysis of the carboxyl group content is performed according to the official method as described in the "Purity Criteria for modified food starches" and found in FAO/WHO papers or in the EU legislation, with the method adoption to carry out the titration on an ambient tempered solution rather than a hot solution and a 0.01 M NaOH solution instead of 0.1 M NaOH.

According to International legislation and also in EU legislation the maximum level of carboxyl groups which can be added to the starch and still be regarded as not being oxidized is 0.1% w/w DM of starch. As a consequence of this, it is thereby possible to determine if a starch product has been treated by an oxidation agent and thus have been oxidized or only bleached. It has been clarified that, according to the present invention, carboxyl groups are not formed in the starch when the oxidant is combined with amino acids according to the inventive method as it is when it is oxidized with an oxidant on its own, and thereby it is clear that no oxidation of the starch molecule has occurred, i.e. below 0.1% added carboxyl-groups of starch DM.

The amount of carboxyl groups formed is shown in table 1 for the product according to example 7c). Accordingly, a potato starch is treated with 0.91% w/w DM PAAC (Potato Amino Acid Concentrate) and 0.73% w/w active chlorine, this product is compared with a native potato starch. With potato starch the reading of the titer has to be adjusted for the level of naturally occurring acidic phosphorous groups in the native starch. It can be seen that the amount of carboxylic groups in the starch which is treated with 0.73% w/w active chlorine on its own is increasing from 0.24% w/w to 0.38% w/w, i.e. an increase with 0.14% w/w, and is therefore defined as an oxidized starch. Thereby, it is defined that starch which has been treated with 0.73% w/w active chlorine without addition of an amino acid according to the inventive method is oxidized. The starch which instead has been treated according to example 7c), i.e. with the same amount of active chlorine, but in combination with an amino acid, PAAC, only has 0.28% w/w carboxylic groups, i.e. and increased level of 0.04% w/w. Thereby it is clear that by combining the active chlorine with an amino acid, an oxidation of the starch molecule is avoided and instead an inhibition of the starch granule is obtained.

TABLE 1

| Sample | DM (% w/w) | Weight of starch sample (g) | Used 0.00985M NaOH in the titration (ml) | Carboxylic groups (% w/w) | Recalculated added carboxylic groups in (% w/w) |
|---|---|---|---|---|---|
| Example 7c 0.73% active chlorine | 70.32% | 7.1011 g | 32.3 ml | 0.28% | 0.04% |
| | 67.84% | 7.3578 g | 44.0 ml | 0.38% | 0.14% |
| Native potato starch | 81.84% | 5.8211 g | 26.7 ml | 0.24% | 0 |

The amount of carboxylic groups are shown in table 2 for the product according to example 1d), i.e. a waxy maize (corn) starch treated with 0.4% w/w active chlorine and 0.133% w/w glycine. This starch product is compared with a native waxy maize (corn) starch as the level of carboxylic groups has to be adjusted with the level that occurs naturally in the native waxy maize (corn) starch. It can be seen that the amount of carboxylic groups in the starch which is treated according to example 1f), i.e. 0.8% w/w of active chlorine is not increasing. Thus, the level is the same as in the native waxy maize (corn) starch, i.e. 0.021% w/w. It can be seen that the amount of carboxylic groups in the starch which is treated according to example 1f), i.e. with 0.8% w/w of active chlorine and 0.267% w/w glycine is only slightly increasing from 0.021% w/w to 0.026% w/w. Thus, the increase of carboxylic groups is only 0.005% w/w DM of starch. Thereby, it is clear that by combining the active chlorine with an amino acid, an oxidation of the starch molecule is avoided and instead an inhibition of the starch granule is obtained.

TABLE 2

| Sample | DM (% w/w) | Weight of starch sample (g) | Used 0.00985M NaOH in the titration (ml) | Carboxylic groups (% w/w) | Recalculated added carboxylic groups in (% w/w) |
|---|---|---|---|---|---|
| Example 1f) 0.8% active chlorine | 87.76% | 5.7275 g | 3.0 ml | 0.026% | 0.005% |
| Example 1d) 0.4% active chlorine | 87.50% | 5.6852 g | 2.4 ml | 0.021% | 0 |
| Native waxy maize (corn) starch | 86.26% | 5.7929 g | 2.4 ml | 0.021% | 0 |

When the inhibition reaction has been completed, an organic acid is added prior to the washing and dewatering with a view to eliminate chemical residuals giving the starch product an unpleasant off-taste or smell of pool water, i.e. chlorinated water, which is common for starches that have been treated with hypochlorite. The kind of organic acid may be chosen from any one of the organic acids that normally are used in food products but preferred are acids which have the ability to act as a reducing agent, like ascorbic acid, which in the past have been used to reduce the formation of chloramines in drinking water after treatment of the water with sodium hypochlorite or chlorine gas. Examples of organic acids are citric acid, adipic acid, erythorbic acid, sodium lactate, potassium lactate, calcium lactate, ascorbic acid, phosphoric acid, and succinic acid. The organic acid may be added separately or in a combination of two or more of these. In one embodiment ascorbic acid is used as organic acid, as it has turned out to be particularly effective in reducing the undesired residual reactant. The added amount of organic acid is 0.001-5% w/w DM starch, preferably 0.01-3% w/w DM starch, more preferably 0.05-1% w/w DM starch. The slurry is left under stirring, e.g. for 15-60 minutes.

Alternatively, an inorganic acid, such as phosphoric acid, sulphuric acid, and hydrochloric acid can be used but the efficiency has been found to be much lower.

An alternative method of eliminating the taste and smell problem involves adding bisulfite. This is a well-known procedure for those skilled in the art to use with a view to destroy the excess of hypochlorite ion or chlorine gas, so that it no longer possesses any oxidation capability. However, using bisulfite is not preferred, as it in International food legislation is regarded to be a potent allergen, and if there are more than 10 ppm residual levels in the starch it must be labeled as an allergen when used in food products. The inhibited starch produced so far according to the inventive method is unstable and only temporary, which means that it loses its inhibition when being stored over time. When the inhibited starch is present in slurry or after drying of the starch, the inhibition will break down during storage and lose its effect on regulating the swelling of the starch granule, ending up in a starch product comparable with a native non-inhibited starch. It has been found that the inhibition will break down rather rapidly, and after only a few weeks storage time in the warehouse under normal conditions the inhibition is more or less totally lost. The same applies for the inhibited starch produced so far according to the inventive method, as well as when using the method disclosed in U.S. Pat. No. 3,463,668.

However, the present invention has found that such an unstable inhibition may be stabilized by addition of an antioxidant. It is not fully understood how the inhibition is stabilized due to the addition of the antioxidant, but experiments have shown that if the starch is inhibited and not stabilized by addition of an antioxidant, and stored under conditions where there is no contact with oxygen, the inhibition is stable. Thereby, the conclusion is that the inhibition is lost due to oxidation, but by adding an antioxidant the inhibition is thereby stabilized also when stored in contact with air. The antioxidant can be selected from all available antioxidants used in food products. The added amount of antioxidant is 0.001-10% w/w DM starch, preferably 0.01-5% w/w DM starch, more preferably 0.1-3% w/w DM starch. The slurry is then left under stirring, e.g. for 15-60 minutes.

Examples of antioxidant are ascorbic acid, sodium ascorbate, calcium ascorbate, erythorbic acid, sodium erythorbate, sodium lactate, potassium lactate, calcium lactate, citric acid, mono-sodium citrate, di-sodium citrate, tri-sodium citrate, mono-potassium citrate, tri-potassium citrate, mono-calcium citrate, di-calcium citrate, tri-calcium citrate, L-tartaric acid, mono-sodium L-tartrate, di-sodium L-tartrate, mono-potassium L-tartrate, di-potassium L-tartrate, sodium potassium L-tartrate, phosphoric acid, mono-sodium phosphate, di-sodium phosphate, tri-sodium phosphate, mono-potassium phosphate, di-potassium phosphate, tri-potassium phosphate, mono-calcium phosphate, di-calcium phosphate, tri-calcium phosphate, mono-magnesium phosphate, di-magnesium phosphate, sodium malate, sodium hydrogen malate, potassium malate, calcium malate, calcium hydrogen malate, meso-tartaric acid, calcium L-tartrate, adipic acid, sodium adipate, potassium adipate, succinic acid, tri-ammonium citrate. The antioxidant used to stabilize the inhibition of the starch may be added separately or in any combination of two or more thereof after the inhibition reaction have taken place.

The temperature at which the inhibition reaction takes place is non-thermic, i.e. may be performed at a temperature below 100° C., e.g. between 5 and 70° C. Such an inhibition is possible for slurry, in contrast to the dry heat inhibition process in which the inhibition takes place at an almost moisture free condition of the starch. The stabilized inhibited starch in the slurry may then be further modified by use of any known modification method used in starch production, e.g. approved food additive chemical modification, and/or physical modification, such as acetylation, hydroxypropylation, chemical cross-linking, OSA modification, enzymatic treatment, dextrinization, gelatinization with a view to make the starch become cold water soluble, and pre-gelatinization before inhibition with a view to make the starch cold water swell able, and/or combinations of two or more thereof. Thereafter, it can be recovered and added as an ingredient in food production. Alternatively, the stabilized inhibited starch may be recovered from the slurry by just further washing and drying and may then be added as an ingredient to a food product.

Examples of food products in which the inhibited starch may be used are different kinds of sauces, soups, dairy products, e.g. fermented Crème Fraiche and yoghurt; batters and breeding; fruit preparations for dairy products and/or baked products, e.g. bake stable fruit preparations; and milk based desserts, e.g. different puddings, vanilla sauces, ice cream, and mousse, etc.

EXAMPLES

Below some examples of the method according to the present invention are disclosed.

Example 1

Example 1a)-f) discloses a method for inhibiting a native granular starch to different levels using glycine in combination with sodium hypochlorite. The native granular starch raw material used was waxy maize (corn) starch with a residual protein content of less than 0.4% as analyzed with the Kjeldahl method and calculated with a protein conversion factor of 6.25.

1a) 0.1% Active Chlorine 869.1 g DM waxy maize (corn) starch was mixed with 1600 g cold tap water in a reaction vessel. The pH was adjusted to 9.0 with a sodium hydroxide solution. The temperature was adjusted to 30° C. 0.29 g (0.033% w/w) glycine was added during agitation. 9.7 g sodium hypochlorite with active chlorine (107 g/l, density: 1.19 g/cm$^3$) was added during agitation. This corresponds to an addition of 0.1% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

1b) 0.2% Active Chlorine 869.1 g DM waxy maize (corn) starch was mixed with 1600 g cold tap water in a reaction vessel. The pH was adjusted to 9.0 with a sodium hydroxide solution. The temperature was adjusted to 30° C. 0.58 g (0.067% w/w) glycine was added during agitation. 19.3 g sodium hypochlorite with active chlorine (107 g/l, density: 1.19 g/cm$^3$) was added during agitation. This corresponds to an addition of 0.2% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

1c) 0.3% Active Chlorine 869.1 g DM waxy maize (corn) starch was mixed with 1600 g cold tap water in a reaction vessel. The pH was adjusted to 9.0 with a sodium hydroxide solution. The temperature was adjusted to 30° C. 0.87 g (0.1% w/w) glycine was added during agitation. 29 g sodium hypochlorite with active chlorine (107 g/l, density: 1.19 g/cm$^3$) was added during agitation. This corresponds to an addition of 0.3% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

1d) 0.4% Active Chlorine 869.1 g DM waxy maize (corn) starch was mixed with 1600 g cold tap water in a reaction vessel. The pH was adjusted to 9.0 with a sodium hydroxide solution. The temperature was adjusted to 30° C. 1.16 g (0.133% w/w) glycine was added during agitation. 38.7 g sodium hypochlorite with active chlorine (107 g/l, density: 1.19 g/cm$^3$) was added during agitation. This corresponds to an addition of 0.4% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

1e) 0.6% Active Chlorine 869.1 g DM waxy maize (corn) starch was mixed with 1600 g cold tap water in a reaction vessel. The pH was adjusted to 9.0 with a sodium hydroxide solution. The temperature was adjusted to 30° C. 1.74 g (0.20% w/w) glycine was added during agitation. 57.9 g sodium hypochlorite with active chlorine (107 g/l, density: 1.19 g/cm$^3$) was added during agitation. This corresponds to an addition of 0.6% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

1f) 0.8% Active Chlorine 869.1 g DM waxy maize (corn) starch was mixed with 1600 g cold tap water in a reaction vessel. The pH was adjusted to 9.0 with a sodium hydroxide solution. The temperature was adjusted to 30° C. 2.32 g (0.267% w/w) glycine was added during agitation. 77.3 g sodium hypochlorite with active chlorine (107 g/l, density: 1.19 g/cm$^3$) was added during agitation. This corresponds to an addition of 0.8% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

The products achieved in examples 1a)-1f) were evaluated with a Brabender Amyloviscograph model E at a dry solids content of 5% w/w using distilled water and a torsion spring of 350 cmg. The evaluation was made at a neutral pH and at a pH of 3.

Figure 2:
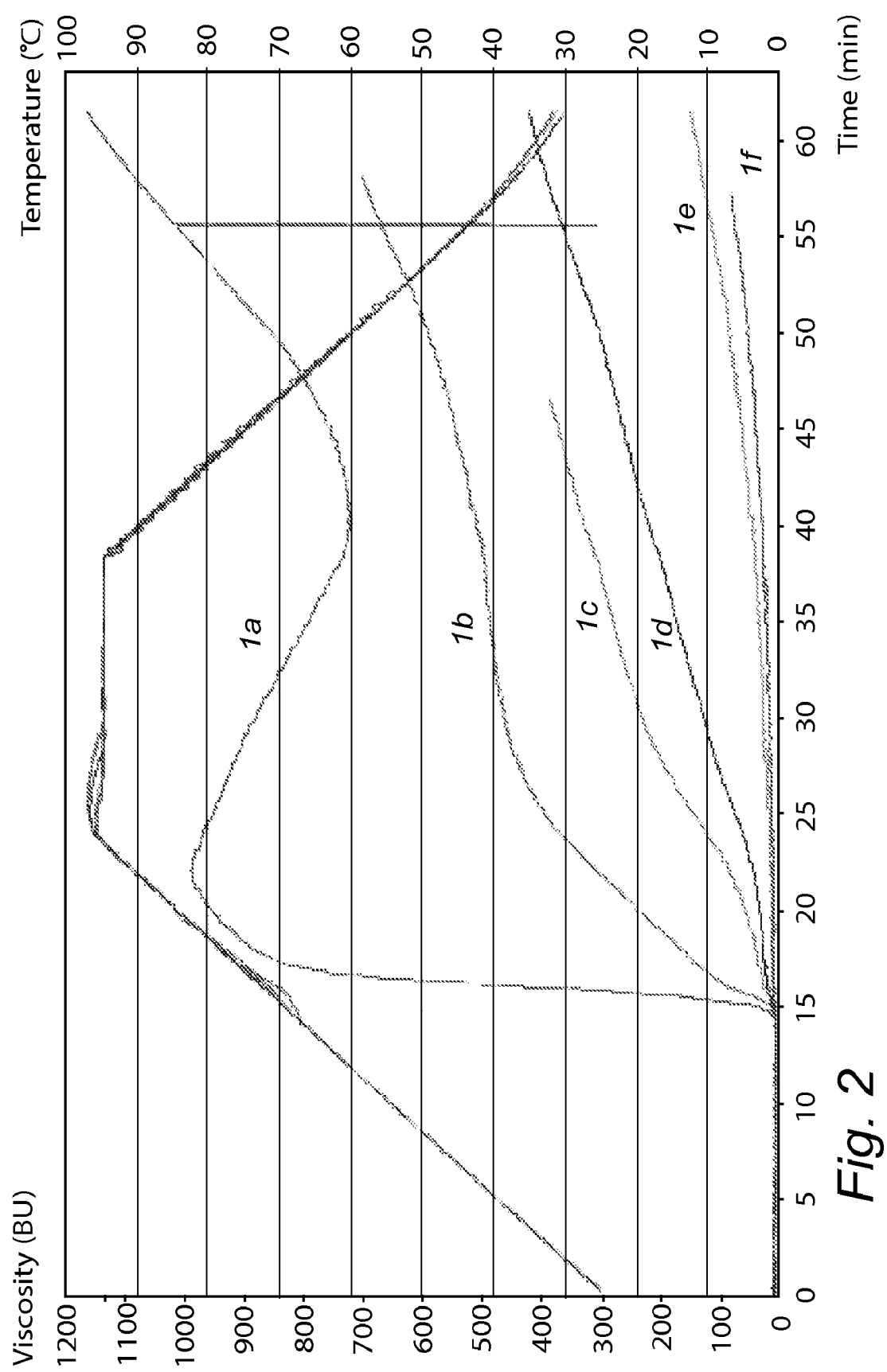
FIG. 2 shows the Brabender viscosity profile at a pH of 3 of inhibited starch according to examples 1a)-1f). A Brabender Amyloviscograph model E was used. Active chlorine: 0.1-0.8% w/w of DM starch. Glycine: 33.3% w/w of active chlorine. Thus, the ratio between active chlorine and glycine was 3:1. Starch concentration: 5% w/w. 350 cmg torsion spring. Distilled water was used for the preparation of the starch slurry in the measurement.

It can be seen in FIGS. 1 and 2 that an increased inhibition is reached when higher levels of active chlorine are added. Thus, the inhibition level is proportional to the concentration of active chlorine. It can also be seen that the inhibition level reached at 0.6-0.8% w/w active chlorine together with glycine is much higher than possible to reach by only adding active chlorine to the same starch in its native state. Thus, the combination of amino acid and active chlorine gives a higher inhibition level.

Example 2

Example 2a) and 2b) discloses a method for inhibition of granular starch with glycine in combination with sodium hypochlorite and the inhibition levels that are reached in comparison with inhibition of the same native granular starch without addition of glycine but the same added amount of active chlorine. The granular starch raw material was waxy maize (corn) starch with a residual protein content of less than 0.4% as analyzed with the Kjeldahl method and calculated with a protein conversion factor of 6.25.

2a) 0.4% Active Chlorine+Glycine 869.1 g of DM waxy corn starch was mixed with 1600 g cold tap water in a reaction vessel. The pH was adjusted to 9.0 with a sodium hydroxide solution. The temperature was adjusted to 30° C. 1.16 g (0.133% w/w) glycine was added during agitation. 38.7 g sodium hypochlorite with active chlorine (107 g/l, density: 1.19 g/cm$^3$) was added during agitation. This corresponds to an addition of 0.4% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

2b) 0.4% Active Chlorine 869.1 g DM waxy maize (corn) starch was mixed with 1600 gram cold tap water in a reaction vessel. The pH was adjusted to 9.0 with a sodium hydroxide solution. The temperature was adjusted to 30° C. 38.7 g sodium hypochlorite with active chlorine (107 g/l, density: 1.19 g/cm$^3$) was added during agitation. This corresponds to an addition of 0.4% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%. This example is actually made according to what is disclosed in U.S. Pat. No. 2,317,752 to show what differs in behavior compared to the present invention.

The products achieved in example 2a) and 2b) were evaluated with a Brabender Amyloviscograph model E at a dry solids level of 5% w/w using distilled water and a torsion spring of 350 cmg. The evaluation was made at a neutral pH, wherein the results are shown in FIG. 3, and at a pH of 3, wherein the results are shown in FIG. 4.

Figure 3:
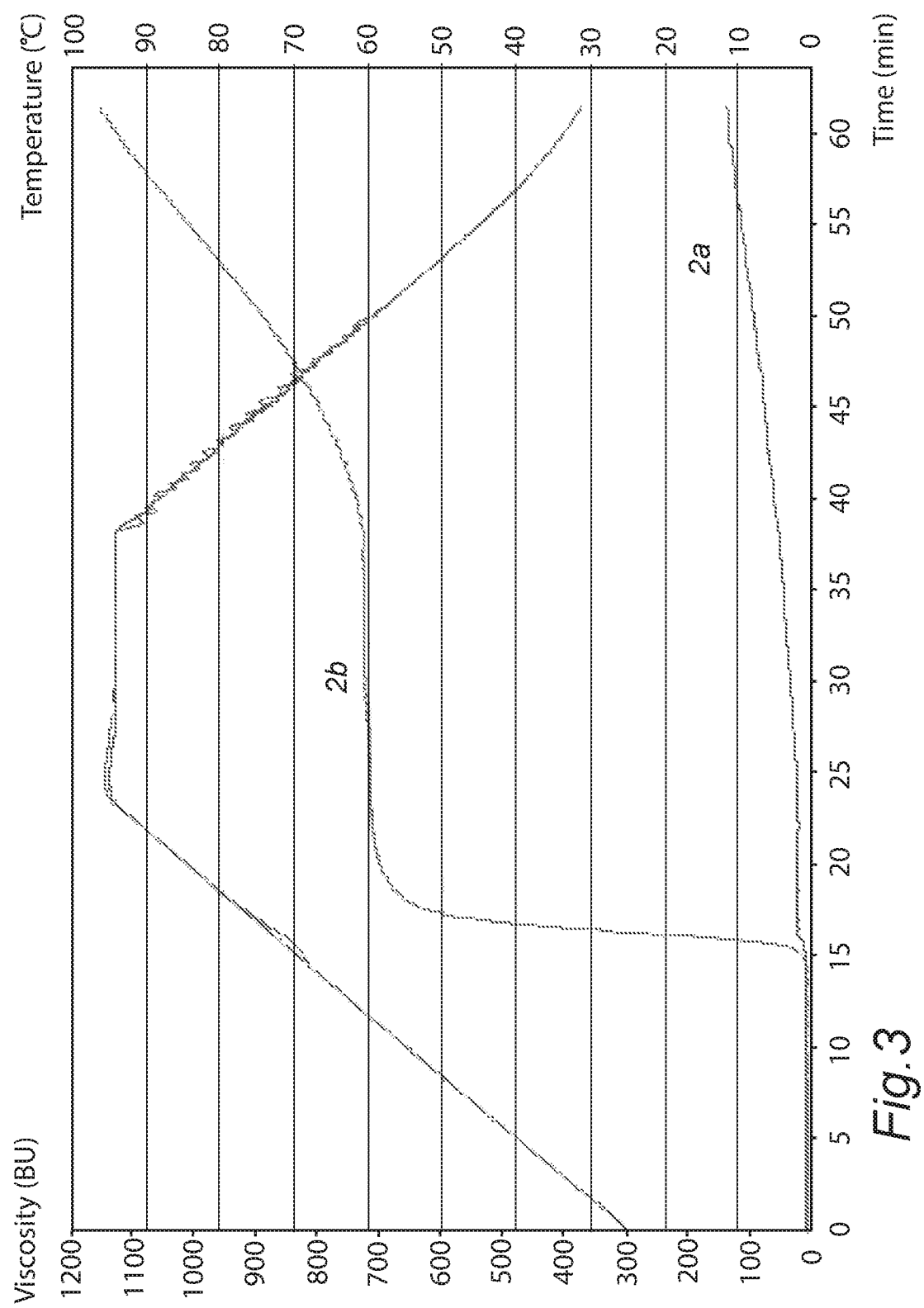
FIG. 3 shows the Brabender viscosity profile at neutral pH of inhibited starch according to examples 2a)-2b). A Brabender Amyloviscograph model E was used. Active chlorine: 0.4% w/w of DM starch. Glycine: 33.3% w/w of active chlorine. Thus, the ratio between active chlorine and glycine was 3:1. The viscosity profile was compared to an inhibited starch product without addition of glycine, but with the same addition of active chlorine. Starch concentration: 5% w/w. 350 cmg torsion spring. Distilled water was used for the preparation of the starch slurry in the measurement.
Figure 4:
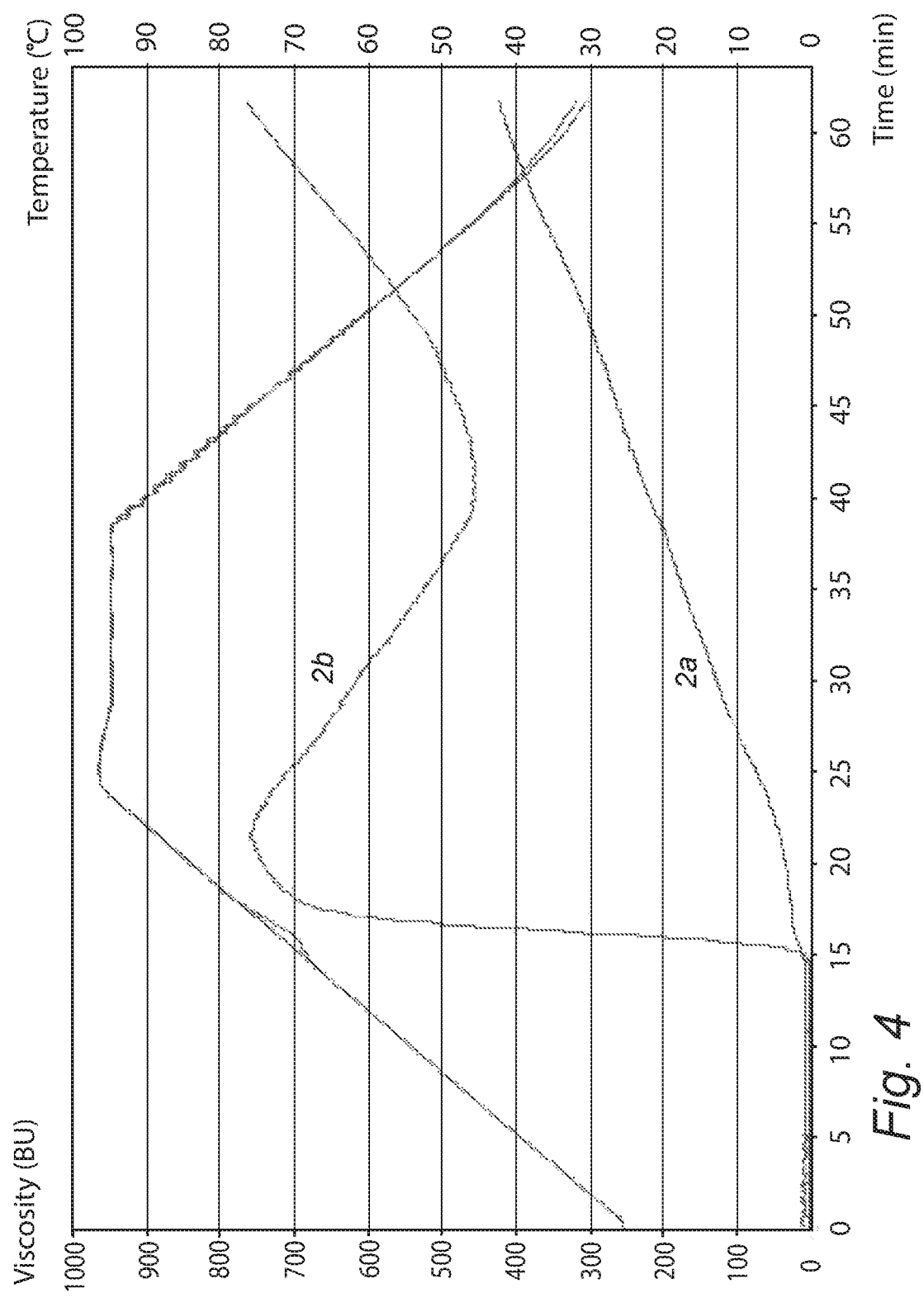
FIG. 4 shows the Brabender viscosity profile at pH 3 of inhibited starch according to examples 2a)-2b). Active chlorine: 0.4% w/w of DM starch. Glycine: 33.3% w/w of active chlorine. Thus, the ratio between active chlorine and glycine was 3:1. The viscosity profile was compared to an inhibited starch product without addition of glycine, but with the same addition of active chlorine. Starch concentration: 5% w/w. 350 cmg torsion spring. Distilled water was used for the preparation of the starch slurry in the measurement.

The results in FIGS. 3 and 4 illustrates that a much higher inhibition level is achieved by adding the amino acid glycine to the reaction compared to the inhibition achieved only by adding sodium hypochlorite to the starch with its naturally occurring residual protein content. This demonstrates that a much higher inhibition level is reached by combining an amino acid (in this example glycine) with active chlorine compared to the inhibition reached with active chlorine alone.

Example 3

Example 3 discloses a method for inhibition of granular starch with glycine in combination with sodium hypochlorite to different inhibition levels. Example 3 further illustrates the problem with the unstable temporary inhibition of the starch granule obtained when the inhibition is achieved by combining an amino acid and an oxidation agent as in the method according to the previous invention disclosed in U.S. Pat. No. 3,463,668.

The native granular starch used in Example 3 was waxy maize (corn) starch with a residual protein content of less than 0.4% as analyzed with the Kjeldahl method and calculated with a protein conversion factor of 6.25.

3) 0.4% Active Chlorine+Glycine 869.1 g DM of waxy maize (corn) starch was mixed with 1600 g cold tap water in a reaction vessel. The pH was adjusted to 9.0 with a sodium hydroxide solution. The temperature was adjusted to 30° C. 1.16 g (0.133% w/w) and glycine was added during agitation. 38.7 g sodium hypochlorite with active chlorine (107 g/l, density: 1.19 g/cm$^3$) was added during agitation. This corresponds to an addition of 0.4% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

The products achieved in Example 3 were stored in ambient conditions and were evaluated with a Brabender Amyloviscograph model E after different storage times at a starch content of 5% DM and using distilled water. A torsion spring of 350 cmg was used. The evaluation was made at neutral pH.

Figure 5:
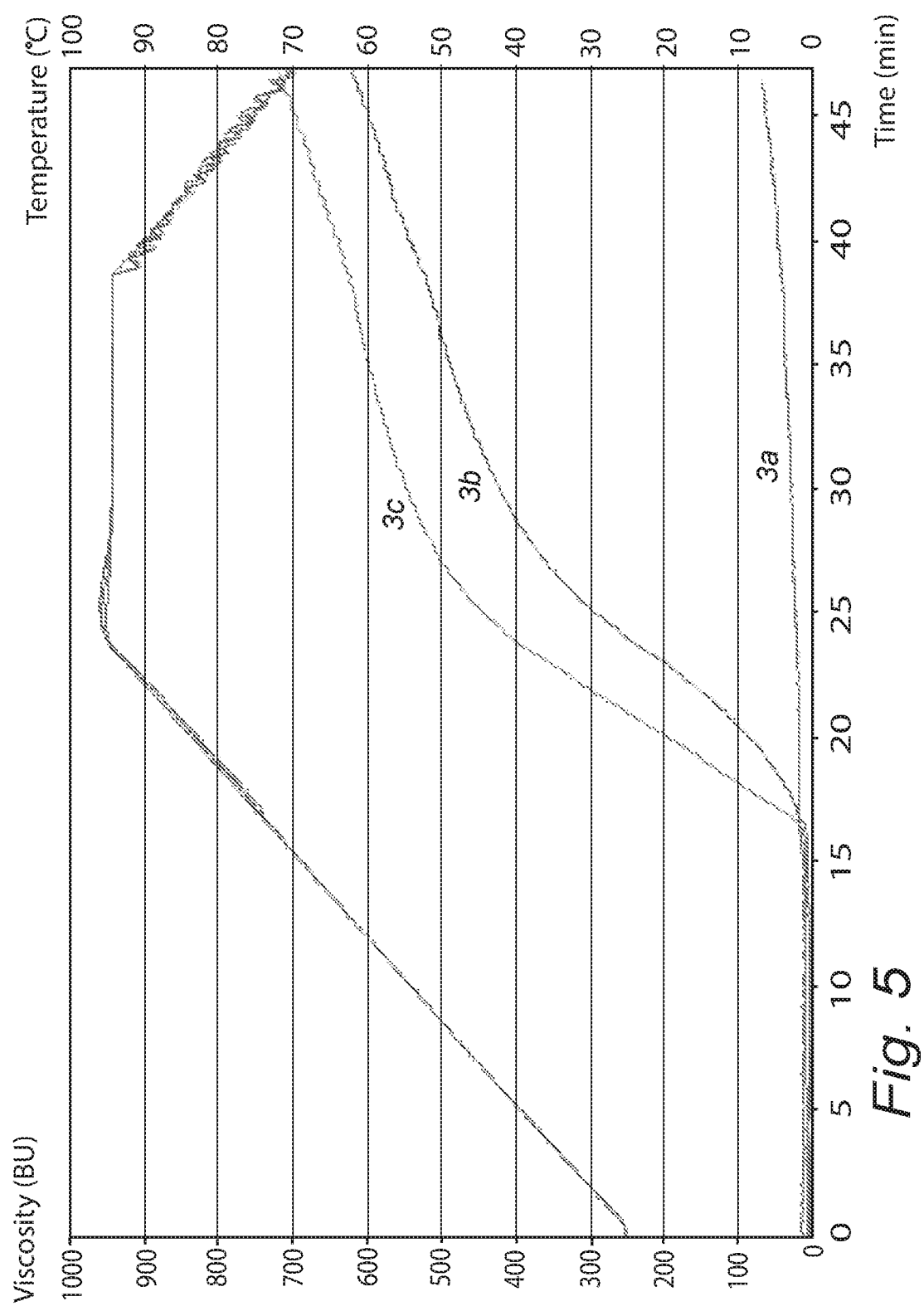
FIG. 5 shows the Brabender viscosity profile at neutral pH of inhibited starch according to example 3. Active chlorine: 0.4% w/w of DM starch. Glycine: 33.3% w/w of active chlorine. Thus, the ratio between active chlorine and glycine was 3:1. Starch concentration: 5% w/w. 350 cmg torsion spring. Distilled water was used for the preparation of the starch slurry in the measurement. The figure illustrates how the inhibition level was changed over time, and, consequently, the inhibition was decreased after storage. Curve 3*a*)=day 1; Curve 3*b*)=day 2; Curve 3*c*)=day 3.

The results from Example 3, illustrated in FIG. 5, demonstrate that the inhibition achieved by combining an amino acid with an oxidation agent, as used in the previous invention disclosed in U.S. Pat. No. 3,463,668, is unstable and that the inhibition level is decreased during storage. In FIG. 5 the curve titled as 3*a*) represents the viscosity profile at day 1, the curve titled as 3*b*) represents storage for 30 days, and the curve titled as 3*c*) represents storage for 200 days.

Example 4

Example 4 discloses a method for inhibition of granular starch with glycine in combination with sodium hypochlorite to different inhibition levels. It further illustrates how the problem with the unstable temporarily inhibition, illustrated in example 3, can be controlled by adding an anti-oxidation agent which stabilizes the achieved inhibition. The native granular starch used in Example 4 was waxy maize (corn) starch with a residual protein content of less than 0.4% as analyzed with the Kjeldahl method and calculated with a protein conversion factor of 6.25.

4) 0.4% Active Chlorine+Glycine 869.1 g DM waxy maize (corn) starch was mixed with 1600 g cold tap water in a reaction vessel. The pH was adjusted to 9.0 with a sodium hydroxide solution. The temperature was adjusted to 30° C. 1.16 gram (0.133% w/w) glycine was added during agitation. 38.7 gram sodium hypochlorite with active chlorine (107 g/l, density: 1.19 g/cm$^3$) was added during agitation. This corresponds to an addition of 0.4% w/w active chlorine of DM starch. The vessel was left under agitation for 180 min, and the temperature was kept at 30° C. 9.5 g of the antioxidant, citric acid, was added during agitation. The starch slurry was left under agitation for 30 min. The starch slurry was adjusted to a pH of 6 and was further dewatered and dried to a dry powder with a moisture content of approximately 15%.

The products achieved in Example 4 were stored at ambient conditions in contact with surrounding air oxygen and were evaluated with a Brabender Amyloviscograph model E at a solids level of 5% using distilled water after different storage times. A torsion spring of 350 cmg was used. The evaluation was made at neutral pH.

Figure 6:
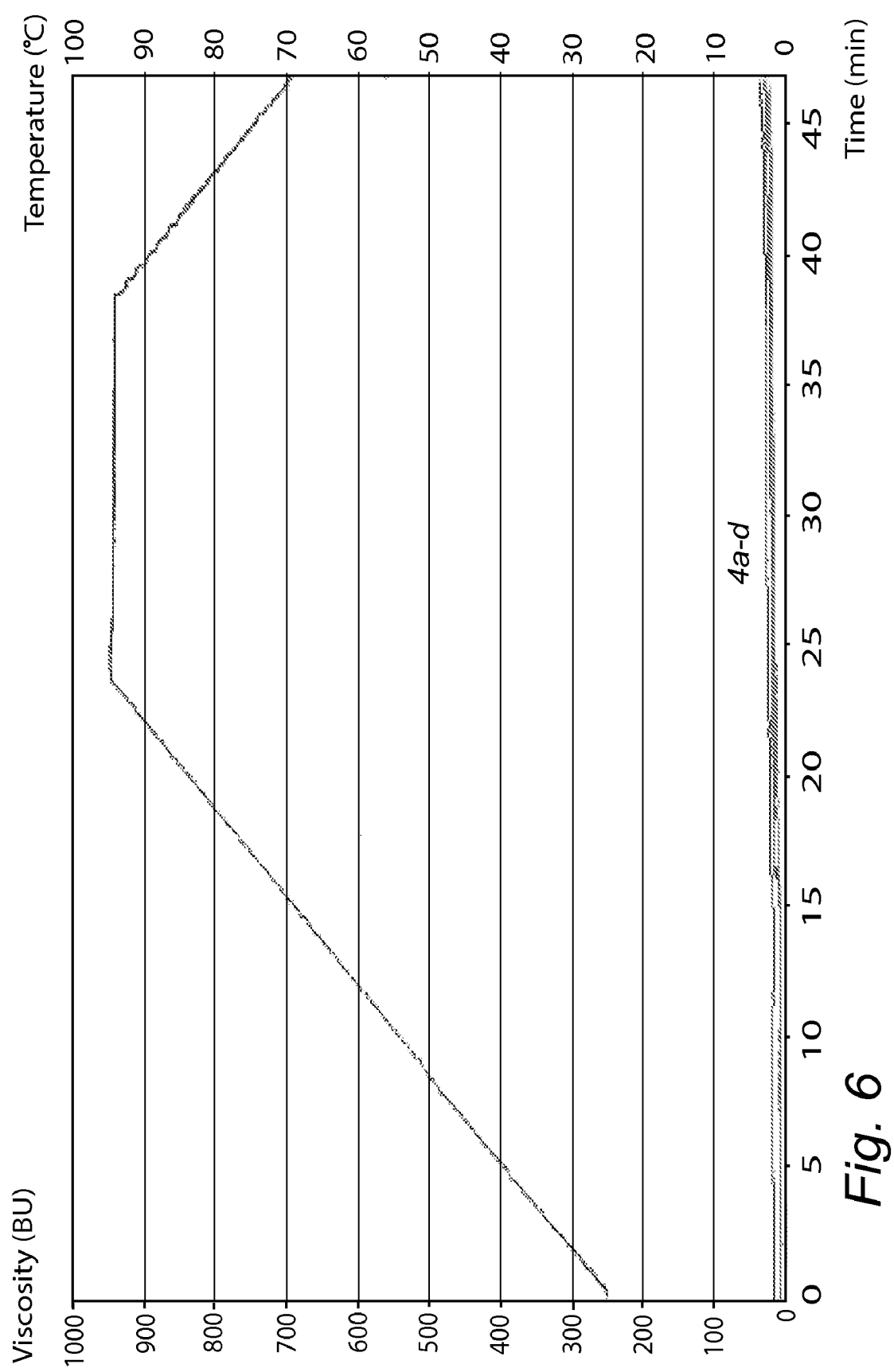
FIG. 6 shows the Brabender viscosity profile at neutral pH of inhibited starch according to example 4. Active chlorine: 0.4% w/w of DM starch. Glycine: 33.3% w/w of active chlorine. Thus, the ratio between active chlorine and glycine was 3:1. 9.5 gram of citric acid as antioxidant was added with a view to get the inhibition stable over time. Starch concentration: 5% w/w. 350 cmg torsion spring. Distilled water was used for the preparation of the starch slurry in the measurement. 4a=day 1; 4d=300 days storage time.

The results from Example 4, illustrated in FIG. 6, demonstrate that the inhibition achieved by a combination between an amino acid and an oxidation agent, which was shown to be unstable in Example 3, is stabilized during storage by addition of an antioxidant after the inhibition reaction, in this example citric acid. In FIG. 6 the curve titled as "4a-d" represents the viscosity profile at day 1-300. It is obvious that there is no change of the viscosity during this extended storage time. Therefore, it has been demonstrated that the unstable inhibition obtained by combining amino acids with an oxidant can be stabilized with an antioxidant added after the inhibition reaction have been taken place.

Example 5

Example 5 discloses a method for inhibiting a native granular starch to different inhibition levels using threonine in combination with sodium hypochlorite. In the example the addition of threonine is fixed to 0.067% w/w, and the addition of sodium hypochlorite is made at different levels resulting in different ratios between active chlorine and threonine. The native granular starch used in Example 3 was waxy maize (corn) starch with a residual protein content of less than 0.4% as analyzed with the Kjeldahl method and calculated with a protein conversion factor of 6.25.

5a) 0.067% Active Chlorine+0.067% w/w Threonine (Ratio 1:1)

869.1 g DM waxy maize (corn) starch was mixed with 1600 g cold tap water in a reaction vessel. The pH was adjusted to 9.0 with a sodium hydroxide solution. The temperature was adjusted to 30° C. 0.58 g (0.067% w/w) threonine was added during agitation. 6.48 gram sodium hypochlorite with active chlorine (107 g/l, density: 1.19 g/cm$^3$) was added during agitation. This corresponds to an addition of 0.067% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%

5b) 0.133% Active Chlorine+0.067% w/w Threonine (Ratio 2:1)

869.1 g DM waxy maize (corn) starch was mixed with 1600 g cold tap water in a reaction vessel. The pH was adjusted to 9.0 with a sodium hydroxide solution. The temperature was adjusted to 30° C. 0.58 g (0.067% w/w) threonine was added during agitation. 12.96 g sodium hypochlorite with active chlorine (107 g/l, density: 1.19 g/cm$^3$) was added during agitation. This corresponds to an addition of 0.133% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

5c) 0.2% Active Chlorine+0.067% w/w Threonine (Ratio 3:1)

869.1 g DM waxy maize (corn) starch was mixed with 1600 g cold tap water in a reaction vessel. The pH was adjusted to 9.0 with a sodium hydroxide solution. The temperature was adjusted to 30° C. 0.58 g (0.067% w/w)

threonine was added during agitation. 19.49 g sodium hypochlorite with active chlorine (107 g/l, density: 1.19 g/cm$^3$) was added during agitation. This corresponds to an addition of 0.2% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

5d) 0.268% Active Chlorine+0.067% w/w Threonine (Ratio 4:1)

869.1 g DM waxy maize (corn) starch was mixed with 1600 g cold tap water in a reaction vessel. The pH was adjusted to 9.0 with a sodium hydroxide solution. The temperature was adjusted to 30° C. 0.58 g (0.067% w/w) threonine was added during agitation. 26.12 g sodium hypochlorite with active chlorine (107 g/l, density: 1.19 g/cm$^3$) was added during agitation. This corresponds to an addition of 0.268% w/w active chlorine of DM starch. The vessel was left under agitation for 180 min, and the temperature was controlled at 30° C. The starch was neutralized to a pH of 6 with sulfuric acid and was further dewatered and dried to a dry powder with a moisture content of approximately 15%.

5e) 0.335% Active Chlorine+0.067% w/w Threonine (Ratio 5:1)

869.1 g DM waxy maize (corn) starch was mixed with 1600 g cold tap water in a reaction vessel. The pH was adjusted to 9.0 with a sodium hydroxide solution. The temperature was adjusted to 30° C. 0.58 g (0.067% w/w) threonine was added during agitation. 32.65 g sodium hypochlorite with active chlorine (107 g/l, density: 1.19 g/cm$^3$) was added during agitation. This corresponds to an addition of 0.335% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

5f) 0.4% Active Chlorine+0.067% w/w Threonine (Ratio 6:1)

869.1 g DM waxy maize (corn) starch was mixed with 1600 g cold tap water in a reaction vessel. The pH was adjusted to 9.0 with a sodium hydroxide solution. The temperature was adjusted to 30° C. 0.58 g (0.067% w/w) threonine was added during agitation. 38.99 g sodium hypochlorite with active chlorine (107 g/l, density: 1.19 g/cm$^3$) was added during agitation. This corresponds to an addition of 0.335% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

The products achieved in Example 5a)-5e) were evaluated with a Brabender Amyloviscograph model E at a dry solids content of 5% using distilled water and a torsion spring of 350 cmg. The evaluation was made at a neutral pH and at a pH of 3.

Figure 7:
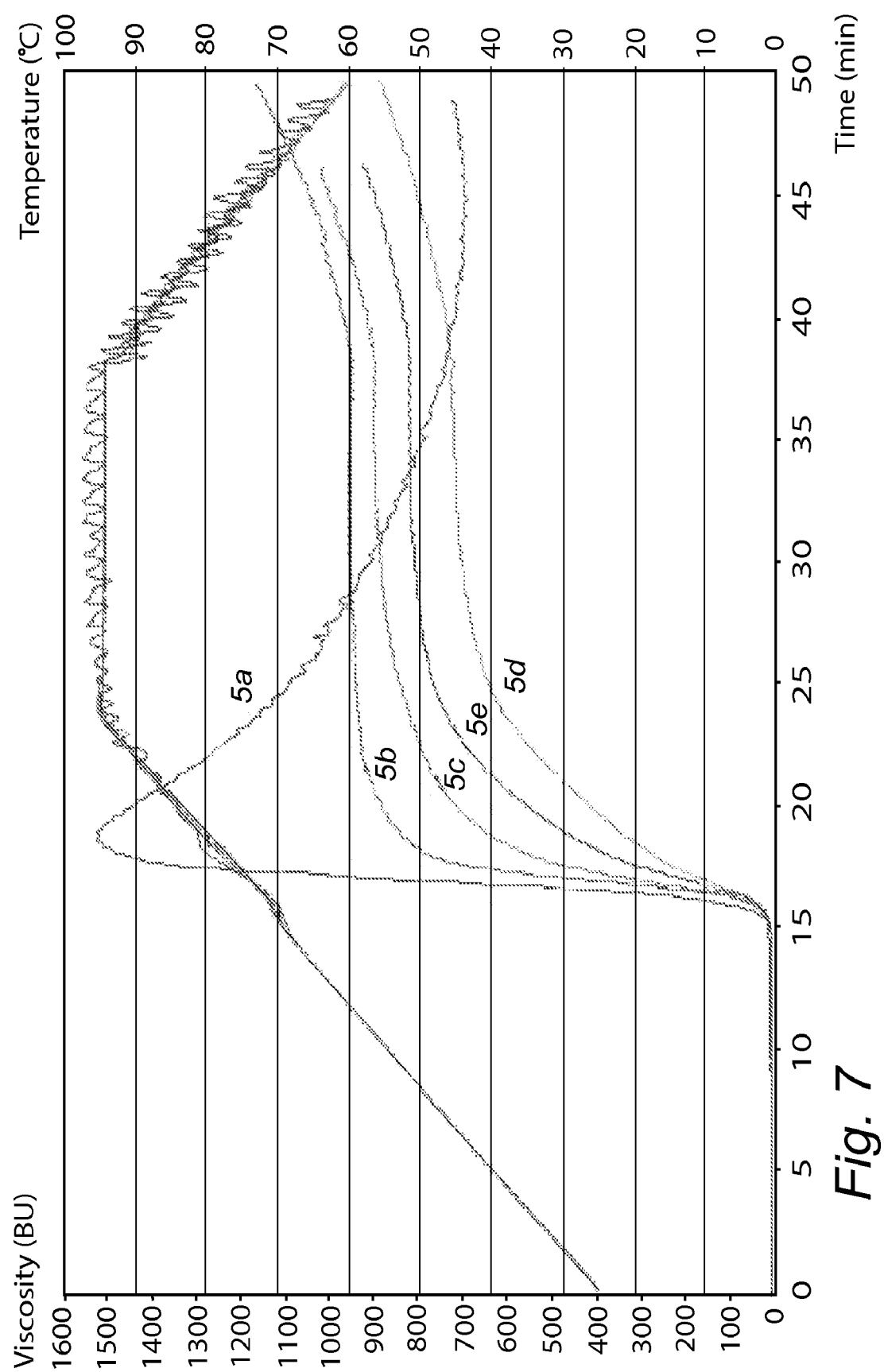
FIG. 7 shows the Brabender viscosity profile at neutral pH of inhibited starch according to example 5. The inhibition was achieved by combining threonine and sodium hypochlorite. Starch solids level in the Brabender run: 5% w/w. Torsion spring: 350 cmg. Distilled water was used for the preparation of the starch slurry in the measurement.
Figure 8:
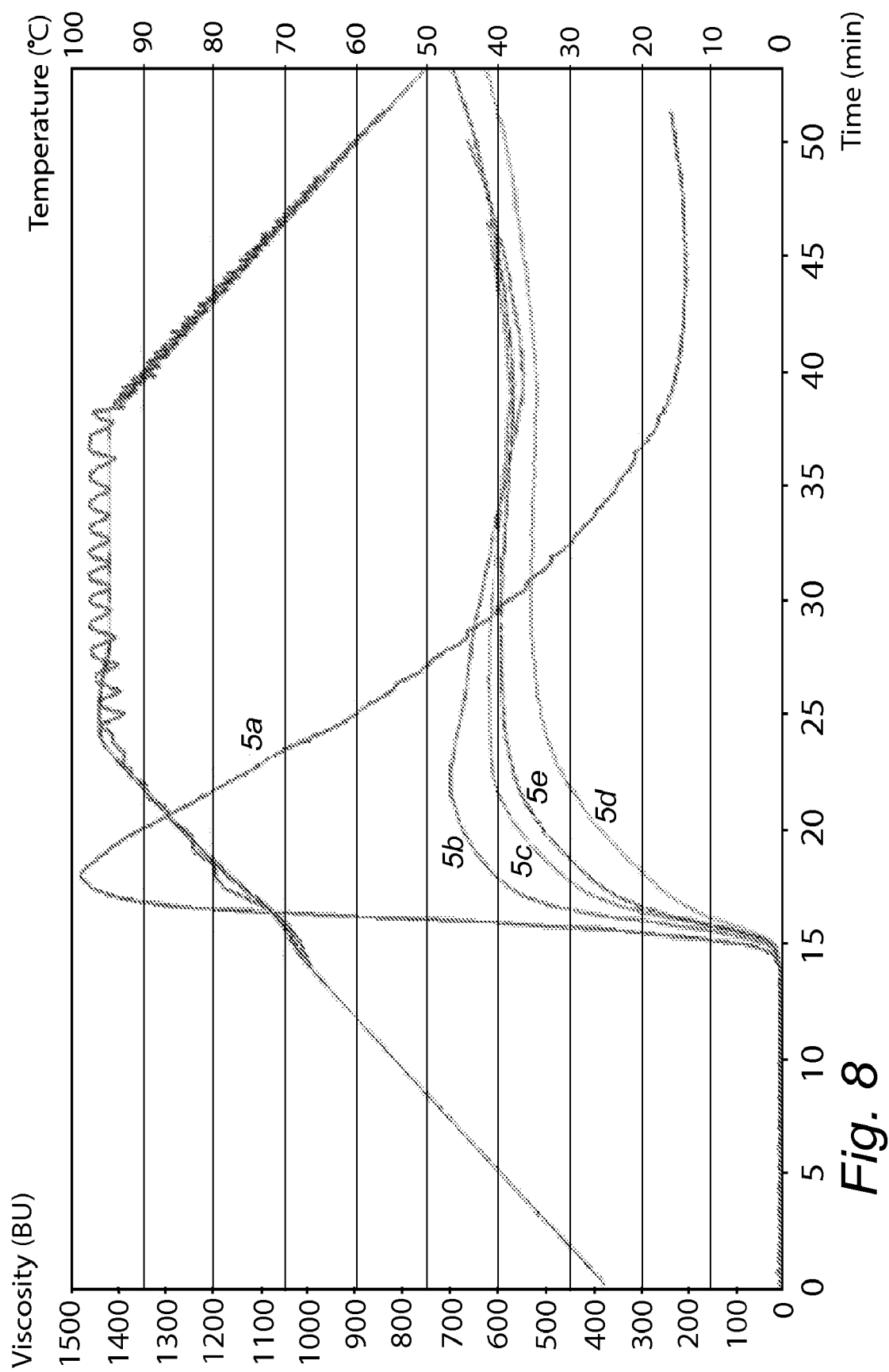
FIG. 8 shows the Brabender viscosity profile at pH 3 of inhibited starch according to example 5. The inhibition was achieved by combining threonine and sodium hypochlorite. Starch solids level in the Brabender run: 5% w/w. Torsion spring: 350 cmg. Distilled water was used for the preparation of the starch slurry in the measurement.

It can be seen in FIGS. 7 and 8 that different inhibition levels are reached at different addition levels of active chlorine. Thus, the inhibition levels are dependent on the ratio of active chlorine and threonine, and the optimal condition is a ratio of 1:5 (threonine:active chlorine). This is different compared to the amino acid glycine which has its optimal inhibition level at a ratio of 1:3 (glycine:active chlorine). It can also be seen that the inhibition level reached at 0.335% w/w active chlorine and 0.067% w/w threonine is much higher than what is possible to reach by only adding active chlorine to the same starch in its native state. Thus, the combination of the amino acid threonine and active chlorine gives a higher inhibition level. Example 5 illustrates that threonine in combination with active chlorine can be used to inhibit starch to a higher inhibition level than what is possible with only active chlorine.

Example 6

Example 6 discloses a method for inhibiting a native granular starch to different inhibition levels using tryptophan in combination with sodium hypochlorite. In the examples the addition of tryptophan is fixed to 0.067% w/w, and the addition of sodium hypochlorite is made at different levels resulting in different ratios between active chlorine and tryptophan. The native granular starch raw material was waxy maize (corn) starch with a residual protein content of less than 0.4% as analyzed with the Kjeldahl method and calculated with a protein conversion factor 6.25.

a) 0.067% Active Chlorine+0.067% w/w Tryptophan (Ratio 1:1)

869.1 g of DM waxy maize (corn) starch was mixed with 1600 g cold tap water in a reaction vessel. The pH was adjusted to 9.0 with a sodium hydroxide solution. The temperature was adjusted to 30° C. 0.58 g (0.067% w/w) tryptophan was added during agitation. 6.48 g sodium hypochlorite with active chlorine (107 g/l, density: 1.19 g/cm$^3$) was added during agitation. This corresponds to an addition of 0.067% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

6b) 0.133% Active Chlorine+0.067% w/w Tryptophan (Ratio 2:1)

869.1 g of DM waxy maize (corn) starch was mixed with 1600 g cold tap water in a reaction vessel. The pH was adjusted to 9.0 with a sodium hydroxide solution. The temperature was adjusted to 30° C. 0.58 g (0.067% w/w) tryptophan was added during agitation. 12.96 g sodium hypochlorite with active chlorine (107 g/l, density: 1.19 g/cm$^3$) was added during agitation. This corresponds to an addition of 0.133% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

6c) 0.168% Active Chlorine+0.067% w/w Tryptophan (Ratio 2.5:1)

869.1 g of DM waxy maize (corn) starch was mixed with 1600 g cold tap water in a reaction vessel. The pH was adjusted to 9.0 with a sodium hydroxide solution. The temperature was adjusted to 30° C. 0.58 g (0.067% w/w) tryptophan was added during agitation. 16.23 g sodium hypochlorite with active chlorine (107 g/l, density: 1.19 g/cm$^3$) was added during agitation. This corresponds to an addition of 0.168% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

6d) 0.2% Active Chlorine+0.067% w/w Tryptophan (Ratio 3:1)

869.1 g of DM waxy corn starch was mixed with 1600 g cold tap water in a reaction vessel. The pH was adjusted to 9.0 with a sodium hydroxide solution. The temperature was adjusted to 30° C. 0.58 g (0.067% w/w) tryptophan was added during agitation. 19.49 g sodium hypochlorite with active chlorine (107 g/l, density: 1.19 g/cm$^3$) was added during agitation. This corresponds to an addition of 0.2% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

6e) 0.23% Active Chlorine+0.067% w/w Tryptophan (Ratio 3.5:1)

869.1 g DM waxy maize (corn) starch was mixed with 1600 g cold tap water in a reaction vessel. The pH was adjusted to 9.0 with a sodium hydroxide solution. The temperature was adjusted to 30° C. 0.58 g (0.067% w/w) tryptophan was added during agitation. 22.23 g sodium hypochlorite with active chlorine (107 g/l, density: 1.19 g/cm$^3$) was added during agitation. This corresponds to an addition of 0.23% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

6f) 0.268% Active Chlorine+0.067% w/w Tryptophan (Ratio 4:1)

869.1 g DM waxy maize (corn) starch was mixed with 1600 g cold tap water in a reaction vessel. The pH was adjusted to 9.0 with a sodium hydroxide solution. The temperature was adjusted to 30° C. 0.58 g (0.067% w/w) tryptophan was added during agitation. 26.12 g sodium hypochlorite with active chlorine (107 g/l, density: 1.19 g/cm$^3$) was added during agitation. This corresponds to an addition of 0.268% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

The products achieved in Example 6a)-6f) were evaluated with a Brabender Amyloviscograph model E at a dry solids content of 5% using distilled water and a torsion spring of 350 cmg. The evaluation was made at a neutral pH and at a pH of 3.

Figure 9:
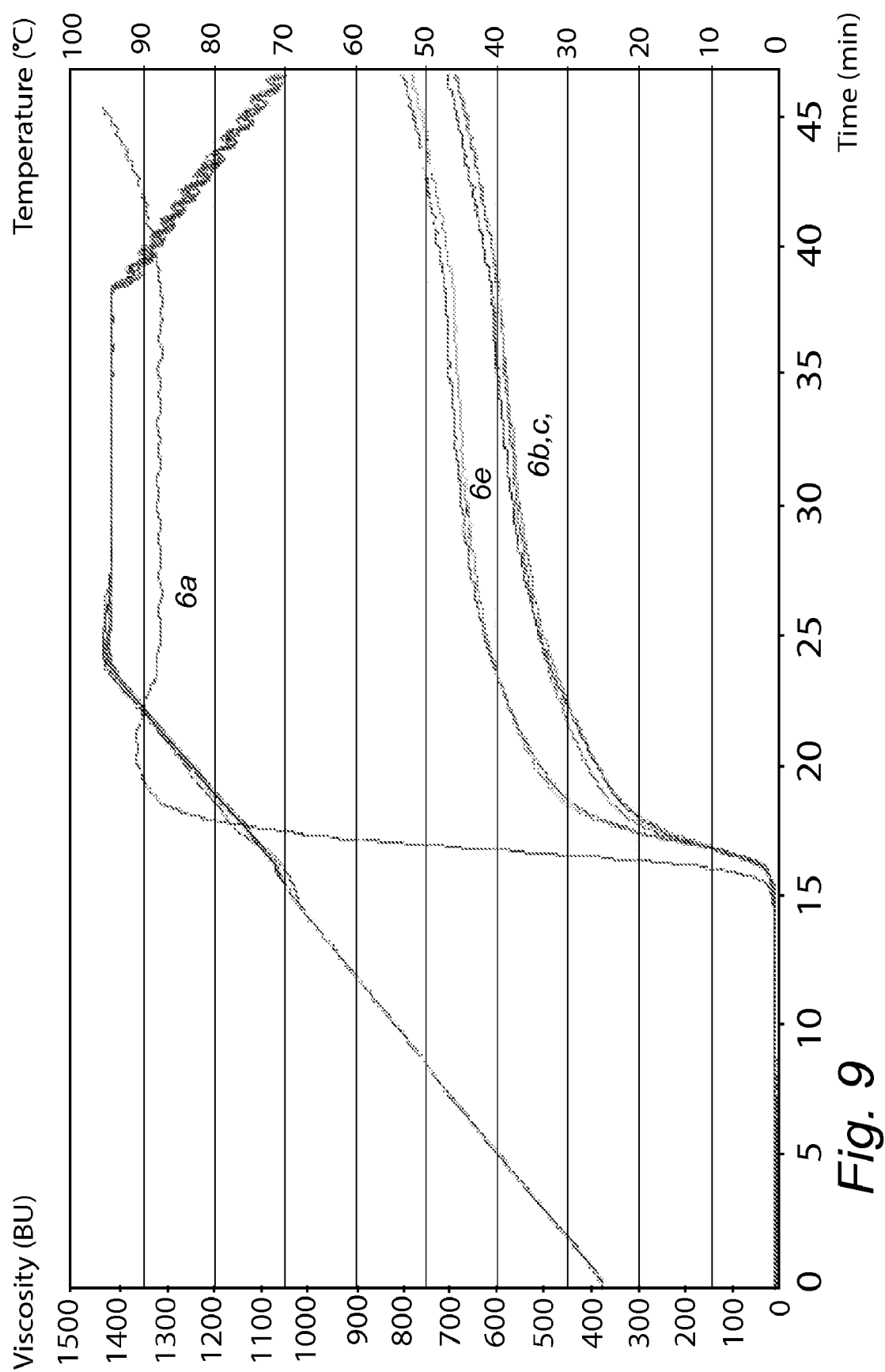
FIG. 9 shows the Brabender viscosity profile at neutral pH of inhibited starch according to example 6. The inhibition achieved by combining tryptophan and sodium hypochlorite. Starch solids level in the Brabender run: 5% w/w. Torsion spring: 350 cmg. Distilled water was used for the preparation of the starch slurry in the measurement.
Figure 10:
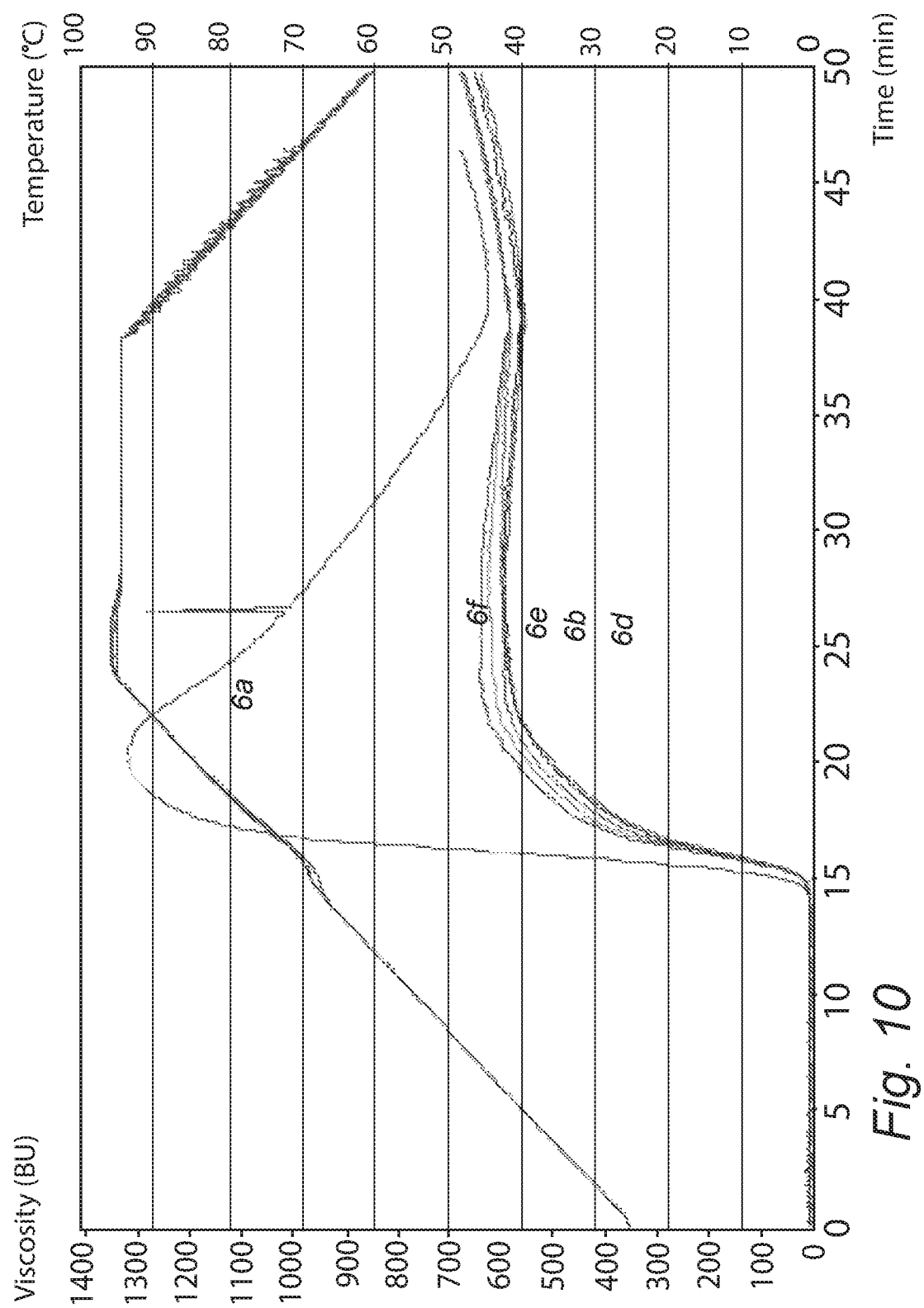
FIG. 10 shows the Brabender viscosity profile at pH 3 of inhibited starch according to example 6. The inhibition was achieved by combining tryptophan and sodium hypochlorite. Starch solids level in the Brabender run: 5% w/w. Torsion spring: 350 cmg. Distilled water was used for the preparation of the starch slurry in the measurement.

It can be seen in FIGS. 9 and 10 that different inhibition levels are reached at different addition levels of active chlorine. Thus, the inhibition levels are dependent on the ratio of active chlorine and tryptophan, and the optimal condition is a ratio of 1:2.5 (tryptophan:active chlorine). This is different compared to the amino acid glycine, which has its optimal inhibition level at a ratio of 1:3 (glycine:active chlorine). It can also be seen that the inhibition level obtained at 0.168% w/w active chlorine and 0.067% w/w of tryptophan on DM starch is much higher than what is possible to reach by only adding active chlorine to the same starch in its native state. Thus, the combination of the amino acid tryptophan and active chlorine gives a higher inhibition level. To conclude, Example 6 illustrates that tryptophan in combination with active chlorine can be used to inhibit starch to a higher inhibition level than what is possible with active chlorine alone.

Example 7

Example 7 illustrates that an amino acid or a combination of amino acids can be derived from the starch raw material source and also that it is possible to achieve the improved inhibition level without using a synthetically produced amino acid or an amino acid combination.

Fruit juice from potatoes from which the starch has been separated, and which is rich of proteins and protein related compounds, i.e. amino acids and peptides, was filtered on a 63 µm screen to separate the remaining fibers. The protein was coagulated with a pH adjustment to 5.1 and a temperature increase to 135° C. for 15 s. The heat coagulated protein was separated using centrifugation at 3000×G during 3 minutes and decantation. The supernatant was concentrated with evaporation to dry matter content (DM) of more than 35%. As a consequence, salts were crystallized and further separated with decantation.

The remaining concentrated solution had a dry matter content of 35% and was filtrated by use of microfiltration using a 0.45 µm filter. The filtrated, amino acid rich solution, hereinafter called PAAC (Potato Amino Acid Concentrate), was used as an amino acid compound in the present example, and the dry matter of PAAC was determined to be 33.3% w/w.

1000 g DM of native granular potato starch with a content of protein residuals below 0.1% was analyzed with the Kjeldahl method and calculated with a protein conversion factor of 6.25. Then it was mixed with 1500 g cold tap water and equilibrated to a temperature of 30° C. The pH was adjusted to 11.0 with a sodium hydroxide solution, and thereafter different amounts of PAAC were added as disclosed below.

7a)

2.3 g DM (0.23% w/w) PAAC was added during agitation. The slurry was left for 60 min during agitation, and the pH was adjusted to 11.0. 20.4 g sodium hypochlorite containing active chlorine (107 g/l, density: 1.19 g/cm$^3$) was added during agitation. This corresponds to an addition of 0.18% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 19%.

7b)

4.55 g DM (0.46% w/w) PAAC was added during agitation. The slurry was left for 60 min with continued agitation, and the pH was adjusted to 11.0. 40.8 g sodium hypochlorite containing active chlorine (107 g/l, density: 1.19 g/cm$^3$) was added during agitation. This corresponds to an addition of 0.37% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 19%.

7c)

9.1 g DM (0.91% w/w) PAAC was added during agitation. The slurry was left for 60 min continued agitation, and the pH was adjusted to 11.0. 81.6 g sodium hypochlorite containing active chlorine (107 g/l, density: 1.19 g/cm$^3$) was added during agitation. This corresponds to an addition of 0.73% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 19%.

Figure 11:
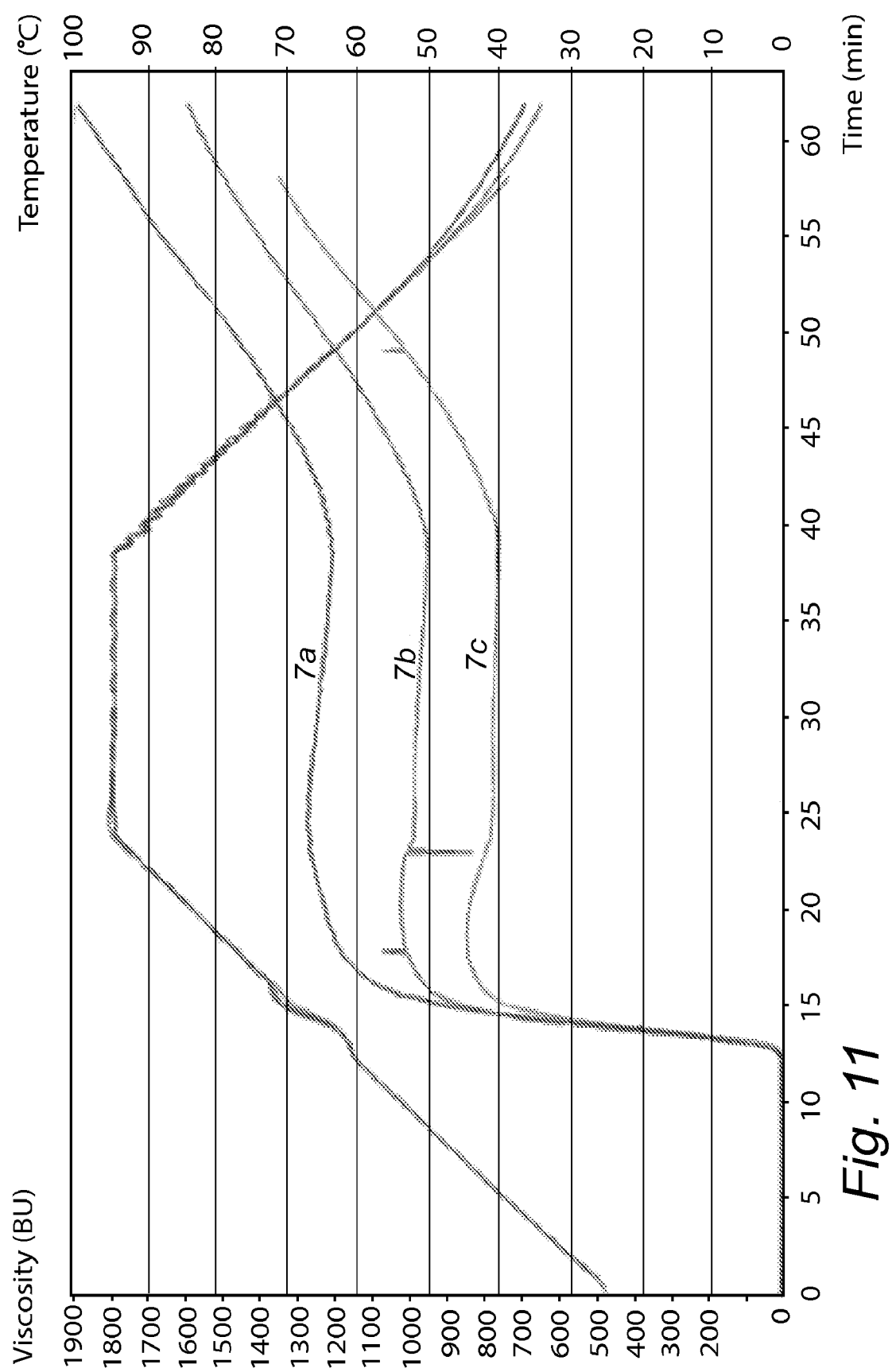
FIG. 11 shows the Brabender viscosity profile at neutral pH of inhibited starch according to example 7. The inhibition was achieved by combining amino acid mix derived from the potato starch source combined with sodium hypochlorite. Starch solids level in the Brabender run: 5% w/w. Torsion spring: 350 cmg. Distilled water was used for the preparation of the starch slurry in the measurement.

The products obtained in Example 7a)-7c) were evaluated with a Brabender Amyloviscograph model E at 5% DM starch using distilled water and a torsion spring of 700 cmg. The evaluation was made at a neutral pH. As appears from FIG. 11 an inhibition is achieved in the examples, and the inhibition is stronger at higher additions of PAAC and active chlorine. The examples and the results should be compared with the results from example 8, wherein a native potato starch is treated with the same amount of active chlorine but without the addition of PAAC. Without the addition of PAAC there is no inhibition. Thereby, it is clear that an inhibition is reached by combining an addition of PAAC with active chlorine.

Example 8

Example 8 illustrates that a potato starch having a protein content of 0.01-0.1% cannot be inhibited without adding an amino acid.

Figure 13:
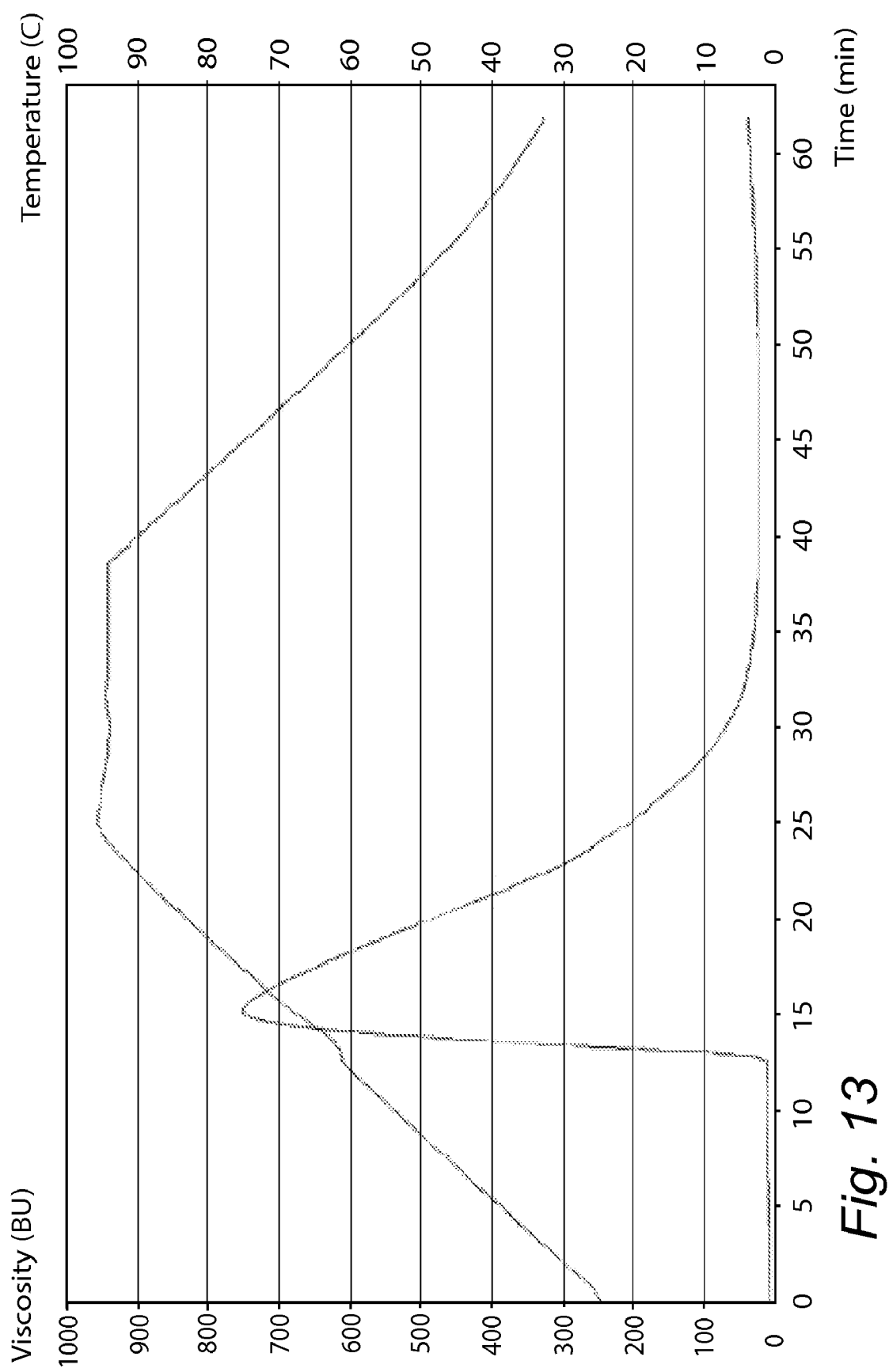
FIG. 13 shows the Brabender viscosity profile at neutral pH of a starch treated according to example 8. Native potato starch was treated with 0.8% w/w active chlorine. Starch concentration: 5% w/w. A 700 cmg torsion spring was used. Distilled water was used for the preparation of the starch slurry in the measurement.

1000 g DM of native granular potato starch with a content of protein residuals below 0.1%, as analyzed with the Kjeldahl method and calculated with a protein conversion factor of 6.25, was then mixed with 1500 g cold tap water and equilibrated to a temperature of 30° C. The pH was adjusted to 11.0 with a sodium hydroxide solution, and thereafter 0.8% w/w of active chlorine was added. The product obtained in Example 8 was evaluated with a Brabender Amyloviscograph model E at 5% DM starch using distilled water and a torsion spring of 700 cmg. The evaluation was made at a neutral pH. As appears from FIG. 13, there has been no inhibition of the starch. Thus, its viscosity profile disclosed in FIG. 13 is comparable to that of a native starch. The example illustrates that an inhibition cannot be achieved by adding an oxidation agent, i.e. active chlorine itself. Thus, it must be combined with an addition of an amino acid, amino acid-like compound, etc according to the inventive method.

Example 9

Example 9 discloses a method for inhibiting a native granular starch using glycine in combination with sodium hypochlorite. The example also illustrates how the gelatinization temperature of the granular starch is changed as a result of the achieved inhibition. The native granular starch raw material was waxy maize (corn) starch with a residual protein content of less than 0.4% as analyzed with the Kjeldahl method and calculated with a protein conversion factor of 6.25.

9) 0.2% Active Chlorine+0.067% Glycine (Ratio 3:1)

869.1 g DM waxy maize (corn) starch was mixed with 1600 g cold tap water in a reaction vessel. The pH was adjusted to 9.0 with a sodium hydroxide solution. The temperature was adjusted to 30° C. 0.58 g (0.067% w/w) glycine was added during agitation. 19.3 g sodium hypochlorite with active chlorine (107 g/l, density: 1.19 g/cm$^3$) was added during agitation. This corresponds to an addition of 0.2% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

The products obtained in Example 9 were evaluated with a Brabender Amyloviscograph model E at a DM content of 16% using distilled water and a torsion spring of 250 cmg. The higher concentration used is to give an instant reading when the starch gelatinizes and a better illustration of the changed gelatinization temperature which clearly has increased to a higher value. The evaluation was made at a neutral pH. The results were compared to those for the native waxy maize (corn) starch and an alkali roasted waxy maize (corn) starch with a similar inhibition level.

Figure 12:
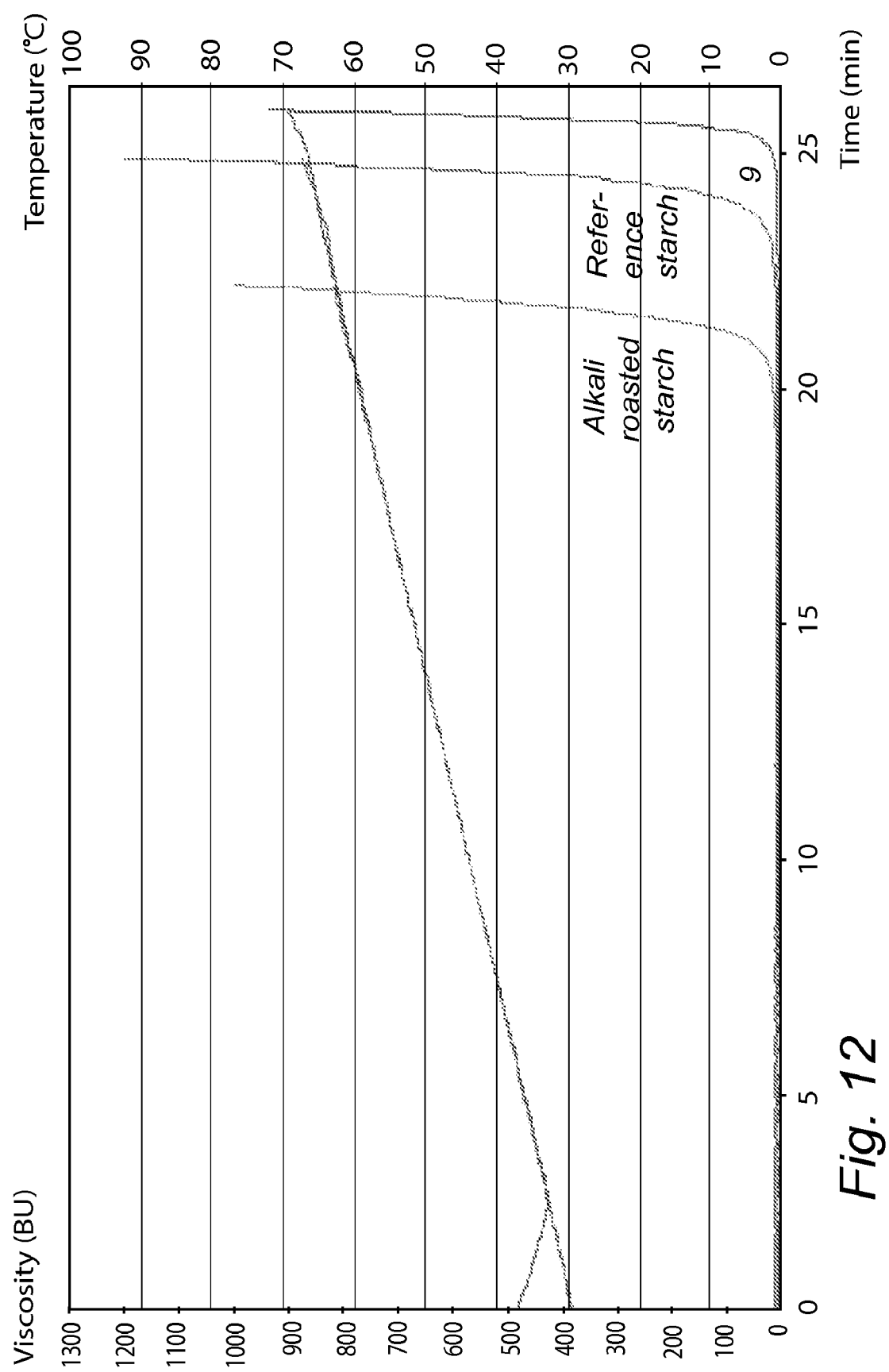
FIG. 12 shows the result of the evaluation of the gelatinization temperature using a Brabender viscosity profile at neutral pH and at 16% DM starch. A 250 cmg torsion spring was used. Inhibited starch according to example 9 was compared to native waxy maize (corn) starch (reference starch) and with an alkali roasted waxy maize (corn) starch with similar inhibition level.

The results, shown in FIG. 12, clearly illustrates that the amino acid inhibited granular starch has a higher gelatinization temperature. According to the Brabender evaluation it was found that the gelatinization temperature for the novel starch is 67° C., for the native waxy maize (corn) starch 64° C., and for the alkali roasted starch 60° C. From these results it can be concluded that the novel inhibited starch has a 3° C. higher gelatinization temperature compared to that for the native starch and a 7° C. higher gelatinization temperature compared to that for the alkali roasted starch with a similar inhibition level. Thus, a starch inhibited to the same inhibition level with amino acid-oxidant inhibition with the method according the present invention has a much higher gelatinization temperature.

Example 10

Example 10 discloses a method for inhibition of granular starch with glycine in combination with sodium hypochlorite. It further illustrates a method to eliminate residuals giving the starch product an unpleasant off-taste or smell of pool water. The native granular starch used in Example 10 was waxy maize (corn) starch with a residual protein content of less than 0.4% as analyzed with the Kjeldahl method and calculated with a protein conversion factor of 6.25.

10) 0.4% Active Chlorine+Glycine 869.1 g DM waxy maize (corn) starch was mixed with 1600 g cold tap water in a reaction vessel. The pH was adjusted to 9.0 with a sodium hydroxide solution. The temperature was adjusted to 30° C. 1.16 gram (0.133% w/w) glycine was added during agitation. 38.7 gram sodium hypochlorite with active chlorine (107 g/l, density: 1.19 g/cm$^3$) was added during agitation. This corresponds to an addition of 0.4% w/w active chlorine of DM starch. The vessel was left under agitation for 180 min, and the temperature was kept at 30° C. The starch slurry was dewatered to 55% DM and further mixed with 890 gram cold tap water. 3 g of the antioxidant, ascorbic acid, was added during agitation. The starch slurry was left under agitation for 30 minutes. The starch slurry was adjusted to a pH of 6 with sulfuric acid. 10 gram citric acid was added during agitation. The starch slurry was left under agitation 30 minutes and was further adjusted to pH 6 with sodium hydroxide. The starch product was further dewatered and dried to a dry powder with a moisture content of approximately 15%. The achieved starch product according to example 10 was further evaluated in example 11 and 12.

Example 11

The starch made according to example 3 and 10 was suspended in distilled water at 5% DM and cooked. The starch pastes were given to a trained panel including 10 people and the starch pastes were tested for off-flavors and smell. All 10 people could feel a chemical off-taste in the starch from example 3, but only 1 from the starch made according to example 10. All 10 felt a "swimming pool" flavor from the starch from example 3, but no one could detect any off-flavors from the starch made according to example 10.

Example 12

Fruit preparations were made with the starches produced according to example 3 and 10 using the following basic formulation:

| | |
|---|---|
| Raspberry | 30% |
| Sugar | 30% |
| Starch | 5% |
| Water | 35% |

The starch was suspended in the water and the raspberries were mixed in. The mix was heated to boiling under agitation on a stove. When the mix started to boil the sugar was added and dissolved. The fruit preparation was cooled down and given to the same trained panel as in example 11 for taste and flavor evaluation.

All 10 people rejected the preparation made with the starch according to example 3 with comments as awful off-taste and chemical flavor. The smell was also commented in view of off-smell. With the preparation made with starch from example 10, there was no one commenting on any chemical off-flavors or smell. 3 persons had comments on taste from maize and masked fruit flavor, which is understandable as it was made from a maize starch.

While the invention has been described with reference to a number of embodiments, it will be understood by those skilled in the art that various changes may be made and equivalents may be substituted for elements thereof without departing from the scope of the present invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

Example 13

The following amino acid homologues of glycine were used in example 13; sarcosine (metylglycin), dimetylglycin, betain (trimetylglycin).

13a) 0.2% Active Chlorine+0.067% w/w Sarcosine (Metylglycine) (Ratio 3:1)

869.1 g of DM waxy corn starch was mixed with 1600 g cold tap water in a reaction vessel. The pH was adjusted to 9.0 with a sodium hydroxide solution. The temperature was adjusted to 30° C. 0.58 g (0.067% w/w) sarcosine (metylglycine) was added during agitation. 19.49 g sodium hypochlorite with active chlorine (107 g/l, density: 1.19 g/cm$^3$) was added during agitation. This corresponds to an addition of 0.2% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

13b) 0.2% Active Chlorine+0.067% w/w Dimetylglycine (Ratio 3:1)

869.1 g of DM waxy corn starch was mixed with 1600 g cold tap water in a reaction vessel. The pH was adjusted to 9.0 with a sodium hydroxide solution. The temperature was adjusted to 30° C. 0.58 g (0.067% w/w) dimetylglycine was added during agitation. 19.49 g sodium hypochlorite with active chlorine (107 g/l, density: 1.19 g/cm$^3$) was added during agitation. This corresponds to an addition of 0.2% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

13c) 0.2% Active Chlorine+0.067% w/w Betaine (Trimetylglycine) (Ratio 3:1)

869.1 g of DM waxy corn starch was mixed with 1600 g cold tap water in a reaction vessel. The pH was adjusted to 9.0 with a sodium hydroxide solution. The temperature was adjusted to 30° C. 0.58 g (0.067% w/w) betaine (trimetylglycine) was added during agitation. 19.49 g sodium hypochlorite with active chlorine (107 g/l, density: 1.19 g/cm$^3$) was added during agitation. This corresponds to an addition of 0.2% w/w active chlorine of DM starch. The vessel was left under agitation for 180 min, and the temperature was kept at 30° C. The starch was neutralized to a pH of 6 with sulfuric acid and was further dewatered and dried to a dry powder with a moisture content of approximately 15%.

The products achieved in Example 13a)-13c) were evaluated with a Brabender Amyloviscograph model E at a dry solids content of 5% using distilled water and a torsion spring of 350 cmg. The evaluation was made at a neutral pH.

Figure 14:
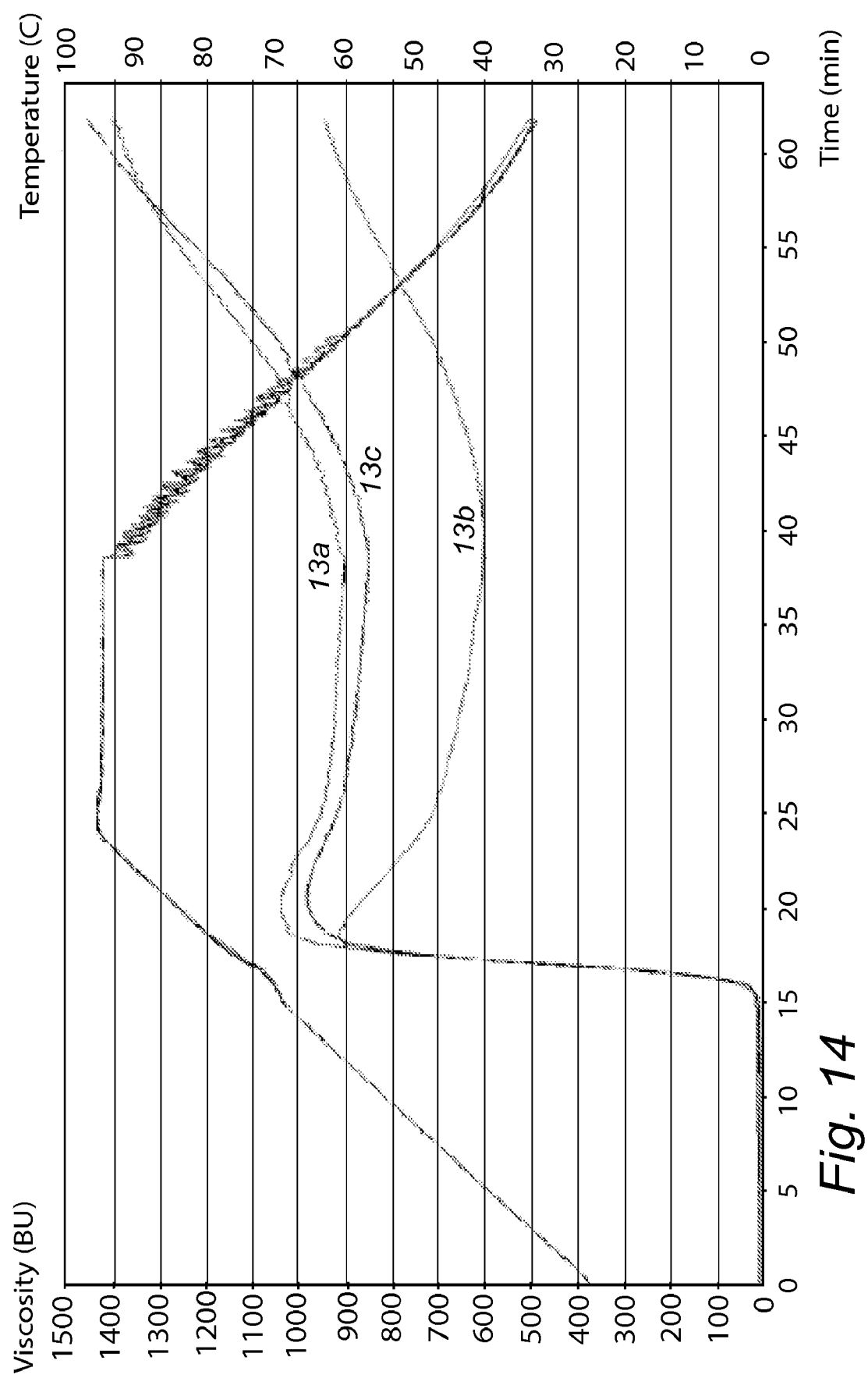
FIG. 14 shows the Brabender viscosity profile at neutral pH of a starch treated according to example 13a-c). The inhibition were achieved by combining glycine homologues and sodium hypochlorite. Starch solids level in the Brabender run: 5% w/w. Torsion spring: 350 cmg. Distilled water was used for the preparation of the starch slurry in the measurement.

In FIG. 14 it appears clearly that an inhibition of the starch is achieved by all of the glycine homologues. The inhibition is higher for betaine and sarcosine compared to dimetylglycine but all of them gives a significant inhibition of the starch granule. The example illustrates that homologues of amino acids is useful for achieving inhibition of the starch granule in combination with sodium hypochlorite.

The invention claimed is:

1. A method for preparing an inhibited starch with improved warehouse storage stability, wherein it comprises the steps of
   a) providing a slurry containing a native granular starch obtained from a starch containing raw material, said native granular starch having a residual protein content of maximum 0.4% DM starch,
   b) inhibiting the native granular starch by adding at least one amino acid, or a combination of two or more of amino acids, and at least one oxidant to the slurry, or a combination of one or more of amino acids and one or more peptides with a molecular weight below 1 kDa, and at least one oxidant to the slurry,
   c) adding at least one organic acid or to the slurry after step b) above,
   c)' washing and dewatering the slurry and eliminating residual reactant chemicals, off-tastes, and undesired smell after step c) above,
   d) stabilizing the achieved inhibition of the starch during warehouse storage by adding at least one antioxidant to the slurry after step c)' above, and
   e) obtaining the inhibited starch comprising a stabilizing effective amount of antioxidant.

2. The method according to claim 1, wherein said at least one amino acid is glycine, alanine, cysteine, aspartic acid, glutamic acid, phenylalanine, histidine, iso-leucine, lysine, leucine, methionine, asparagine, proline, glutamine, arginine, serine, threonine, valine, tryptophan, and tyrosine, or a homolog or optic isomer thereof.

3. The method according to claim 1 or 2, wherein said at least one amino acid, or the combination of two or more of these, is present in a protein hydrolysate.

4. The method according to any one of the preceding claims, wherein said at least one amino acid, or the combination of two or more of these, is extracted from said starch containing raw material from which the starch to be inhibited originates from or another natural starch source.

5. The method according to any one of the preceding claims, wherein said at least one amino acid, or the combination of two or more of these, is/are synthetically produced.

6. The method according to any one of the previous claims, wherein said at least one amino acid, or the combination of two or more of these, is/are added in an amount of 0.01-10% w/w DM starch.

7. The method according to any one of the preceding claims, wherein the starch to be inhibited is potato starch, maize (corn) starch, tapioca starch, barley starch, rice starch, wheat starch, rye starch, oat starch, amaranth starch, quinoa starch, sago starch, bean starches, pea starch, Floridian starch, waxy potato starch, waxy corn starch, waxy tapioca starch, waxy barley starch, waxy rice starch, waxy sorghum, waxy wheat starch, waxy pea starch, and high amylose starches, or a combination of two or more of these.

8. The method according to any one of the preceding claims, wherein the oxidant is a source of active chlorine.

9. The method according to claim 8, wherein the hypochlorite is sodium, calcium, magnesium, or potassium hypochlorite.

10. The method according to any one of the previous claims, wherein the oxidant is added in an amount of 0.03-30% w/w DM starch.

11. The method according to any one of the preceding claims, wherein said at least one organic acid is citric acid, adipic acid, sodium lactate, potassium lactate, calcium lactate, ascorbic acid and succinic acid, or a combination of two or more thereof.

12. The method according to any one of the previous claims, wherein at least one organic acid or bisulfite is added in an amount of 0.001-5% w/w DM starch.

13. The method according to claim 1, wherein said at least one antioxidant is ascorbic acid, sodium ascorbate, calcium ascorbate, erythorbic acid, sodium erythorbate, sodium lactate, potassium lactate, calcium lactate, citric acid, mono-sodium citrate, di-sodium citrate, tri-sodium citrate, mono-potassium citrate, tri-potassium citrate, mono-calcium citrate, di-calcium citrate, tricalcium citrate, L-tartaric acid, mono-sodium L-tartrate, di-sodium L-tartrate, monopotassium L-tartrate, di-potassium L-tartrate, sodium potassium L-tartrate, phosphoric acid, mono-sodium phosphate, di-sodium phosphate, tri-sodium phosphate, mono-potassium phosphate, di-potassium phosphate, tri-potassium phosphate, mono-calcium phosphate, di-calcium phosphate, tri-calcium phosphate, mono-magnesium phosphate, di-magnesium phosphate, sodium malate, sodium hydrogen malate, potassium malate, calcium malate, calcium hydrogen malate, mesa-tartaric acid, calcium L-tartrate, adipic acid, sodium adipate, potassium adipate, succinic acid, tri-ammonium citrate or a combination of two or more thereof.

14. The method according to any one of the previous claims, wherein the antioxidant is added in an amount of 0.001-10% w/w DM starch.

15. The method according to any one of the preceding claims, wherein the starch also may be modified by acetylation, hydroxypropylation, chemical cross-linking, OSA modification, enzymatic treatment, dextrinization, gelatinization with a view to make the starch cold water soluble, pre-gelatinization before inhibition with a view to make the starch cold water swelling, and a combination of two or more thereof.

16. An inhibited starch with improved warehouse storage stability prepared with the method according to claim 1.

17. Use of the inhibited starch according to claim 16 as an ingredient in a food product.

18. Food product containing the inhibited starch according to claim 16, wherein said food product may be chosen from different kinds of sauces; soups; dairy products; batters and breeding; fruit preparations for dairy products and/or baked products; and milk based desserts.

19. Food product containing the inhibited starch according to claim 18, wherein said food product may be chosen from fermented Creme Fraiche, yoghurt, a bake stable fruit preparation, pudding, vanilla sauce, ice cream, or mousse.

20. The method according to claim 1, wherein said at least one amino acid, or the combination of two or more of these, is/are added in an amount of 0.05-3% w/w DM starch, the oxidant is added in an amount of 0.1-10% w/w DM starch, and the antioxidant is added in an amount of 0.01-5% w/w DM starch.

* * * * *